US012791962B2

(12) United States Patent
Uoo et al.

(10) Patent No.: US 12,791,962 B2
(45) Date of Patent: Nov. 10, 2026

(54) TONER CONTAINER AND IMAGE FORMING APPARATUS

(71) Applicant: CANON KABUSHIKI KAISHA, Tokyo (JP)

(72) Inventors: Yukino Uoo, Shizuoka (JP); Goshi Ozaki, Kanagawa (JP); Hiroyuki Munetsugu, Kanagawa (JP); Shinichi Nishida, Kanagawa (JP); Sohta Sugimoto, Kanagawa (JP); Masahiro Suetsugu, Kanagawa (JP); Seiya Ishikawa, Tokyo (JP); Mitsuhiro Sato, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/970,247

(22) Filed: Dec. 5, 2024

(65) Prior Publication Data

US 2025/0189908 A1 Jun. 12, 2025

(30) Foreign Application Priority Data

Dec. 7, 2023 (JP) ................................ 2023-207101

(51) Int. Cl.

| | |
|---|---|
| ***G03G 15/08*** | (2006.01) |
| ***B32B 27/08*** | (2006.01) |
| ***B32B 27/32*** | (2006.01) |

(52) U.S. Cl.

CPC ......... *G03G 15/0874* (2013.01); *B32B 27/08* (2013.01); *B32B 27/32* (2013.01); *B32B 2250/02* (2013.01); *B32B 2250/242* (2013.01); *B32B 2307/518* (2013.01); *B32B 2439/40* (2013.01); *G03G 2215/0682* (2013.01)

(58) Field of Classification Search

CPC .................. G03G 15/0874; G03G 2215/0682

See application file for complete search history.

(56) References Cited

U.S. PATENT DOCUMENTS

| | | | | |
|---|---|---|---|---|
| 2001/0041083 A1* | 11/2001 | Terazawa ........... | G03G 15/0874 399/258 |
| 2002/0025196 A1* | 2/2002 | Matsumoto ........ | G03G 15/0865 399/258 |

(Continued)

FOREIGN PATENT DOCUMENTS

| | | |
|---|---|---|
| JP | 2006258935 A | 9/2006 |
| JP | 2019086697 A | 6/2019 |

(Continued)

OTHER PUBLICATIONS

Bilal, S. (Sep. 6, 2023). BOPP Vs CPP Films. Firsta. https://www.firstagroup.com/resources/bopp-vs-cpp-films.html (Year: 2023).*

*Primary Examiner* — Carla J Therrien

(74) *Attorney, Agent, or Firm* — Canon U.S.A., Inc. IP Division

(57) ABSTRACT

A toner container includes a pouch for storing toner, the pouch being formed of a film and having an opening portion, and a nozzle attached to the opening portion of the pouch and provided with a discharge port for discharging the toner stored in the pouch outside the toner container. A filter member configured to allow air to pass through and prevent the toner from passing through is provided at a part of the pouch.

9 Claims, 30 Drawing Sheets

(56) References Cited

U.S. PATENT DOCUMENTS

| | | | | |
|---|---|---|---|---|
| 2004/0197120 | A1* | 10/2004 | Yanagisawa ....... | G03G 15/0865 399/258 |
| 2005/0089347 | A1* | 4/2005 | Muramatsu ........ | G03G 15/0874 399/262 |
| 2007/0274743 | A1* | 11/2007 | Tamura .............. | G03G 15/0879 399/258 |
| 2013/0039678 | A1* | 2/2013 | Yoshida ............. | G03G 15/0874 399/262 |
| 2019/0193896 | A1* | 6/2019 | Mulford ............... | B65D 77/225 |

FOREIGN PATENT DOCUMENTS

| | | | |
|---|---|---|---|
| JP | 2022178032 | A | 12/2022 |
| JP | 2023095732 | A | 7/2023 |

* cited by examiner

TONER CONTAINER AND IMAGE FORMING APPARATUS

BACKGROUND

Field

The present disclosure relates to a toner container attachable to an image forming apparatus for forming an image on a recording medium.

Description of the Related Art

In general, an electrophotographic image forming apparatus forms an image by transferring a toner image formed on a surface of a photosensitive drum onto a transfer material serving as a transfer medium. In addition, for example, a process cartridge method and a toner supply method are known as toner supply methods. The process cartridge method is a method of integrating a photosensitive drum and a development container as a process cartridge, and replacing the process cartridge with a new one when the toner in the process cartridge runs out.

On the other hand, the toner supply method is a method of newly replenishing toner in the development container when the toner in the development container runs out. For example, Japanese Patent Application Laid-Open No. 2023-095732 discusses an image forming apparatus having a configuration of replenishing toner in a development container using a toner pack attachable to an attachment portion provided on the development container. Further, Japanese Patent Application Laid-Open No. 2023-095732 discusses a configuration of smoothly discharging toner in the toner pack by filling the toner at a predetermined toner-to-air mixture ratio or less.

SUMMARY

According to some embodiments, a toner container includes a pouch configured to store toner, the pouch being formed of a film and having an opening portion, and a nozzle attached to the opening portion of the pouch and provided with a discharge port for discharging the toner stored in the pouch outside the toner container. A filter member configured to allow air to pass through and prevent the toner from passing through is provided at a part of the pouch.

Further features of the present disclosure will become apparent from the following description of exemplary embodiments with reference to the attached drawings.

DESCRIPTION OF THE EMBODIMENTS

Hereinbelow, various exemplary embodiments, features, and aspects of the present disclosure will be described in detail with reference to the attached drawings.

<Image Forming System>

Figure 2A:
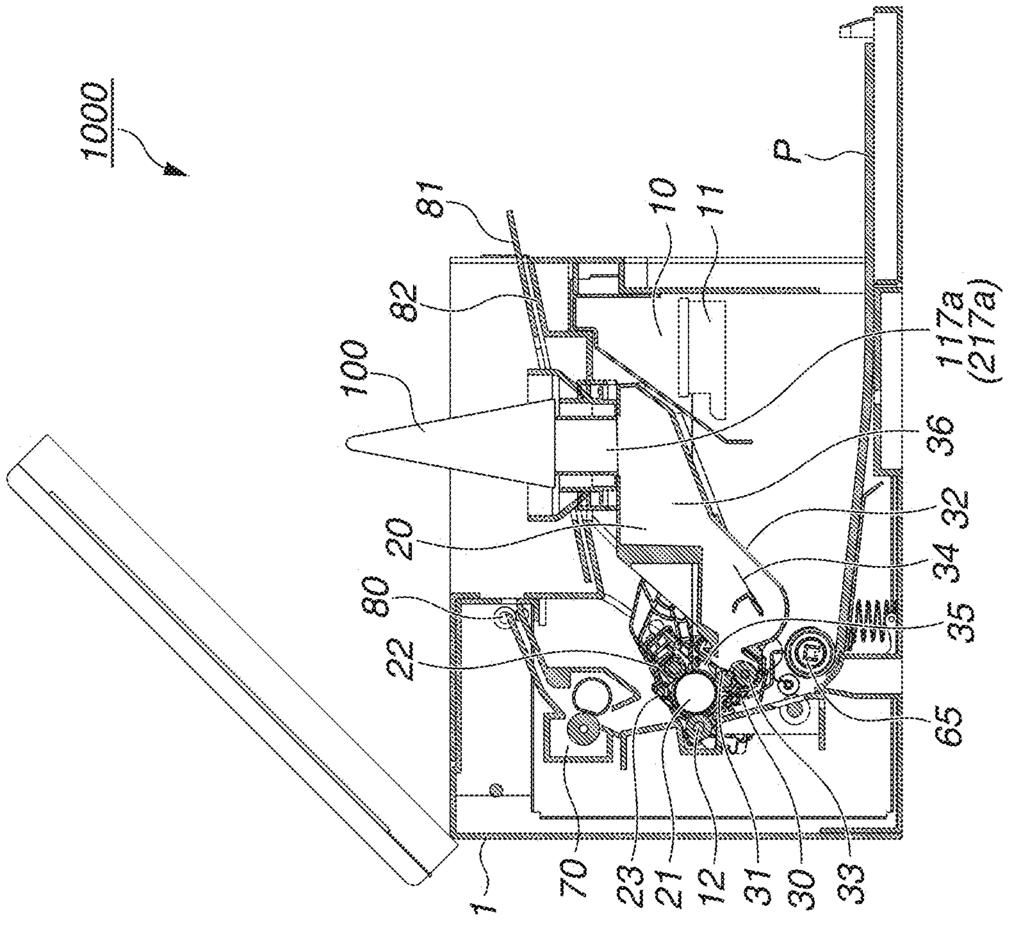
FIGS. 2A and 2B respectively are a cross-section view and a perspective view schematically illustrating an image forming system.
Figure 2B:
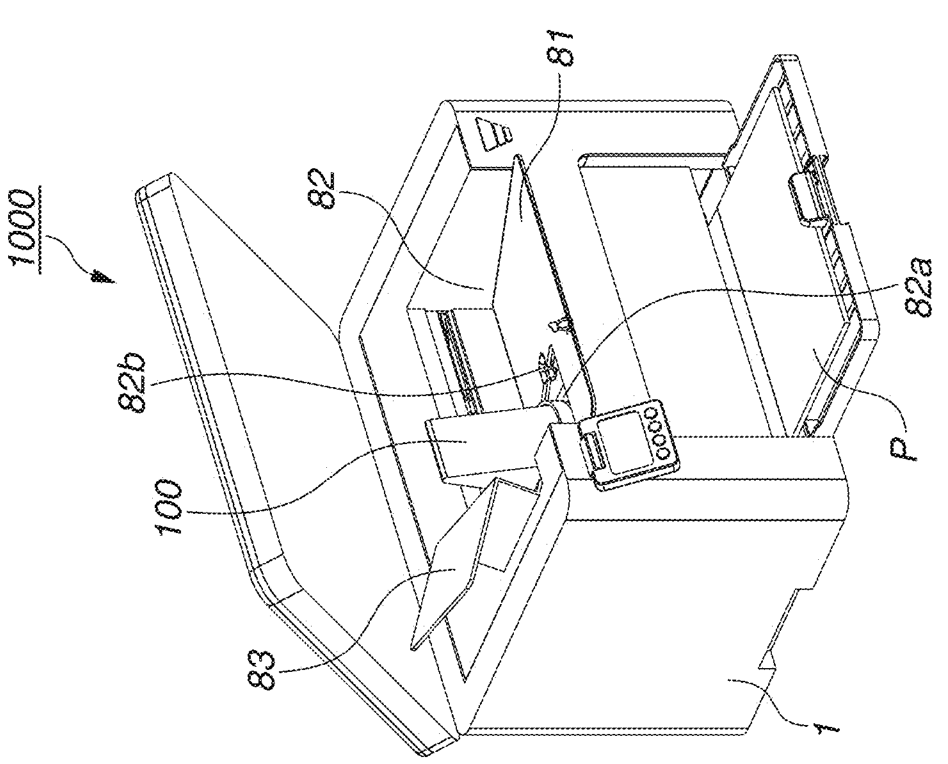

FIG. 2A is a cross-section view schematically illustrating a configuration of an image forming system 1000 according to a first exemplary embodiment. FIG. 2B is a perspective view illustrating the image forming system 1000.

Figure 3:
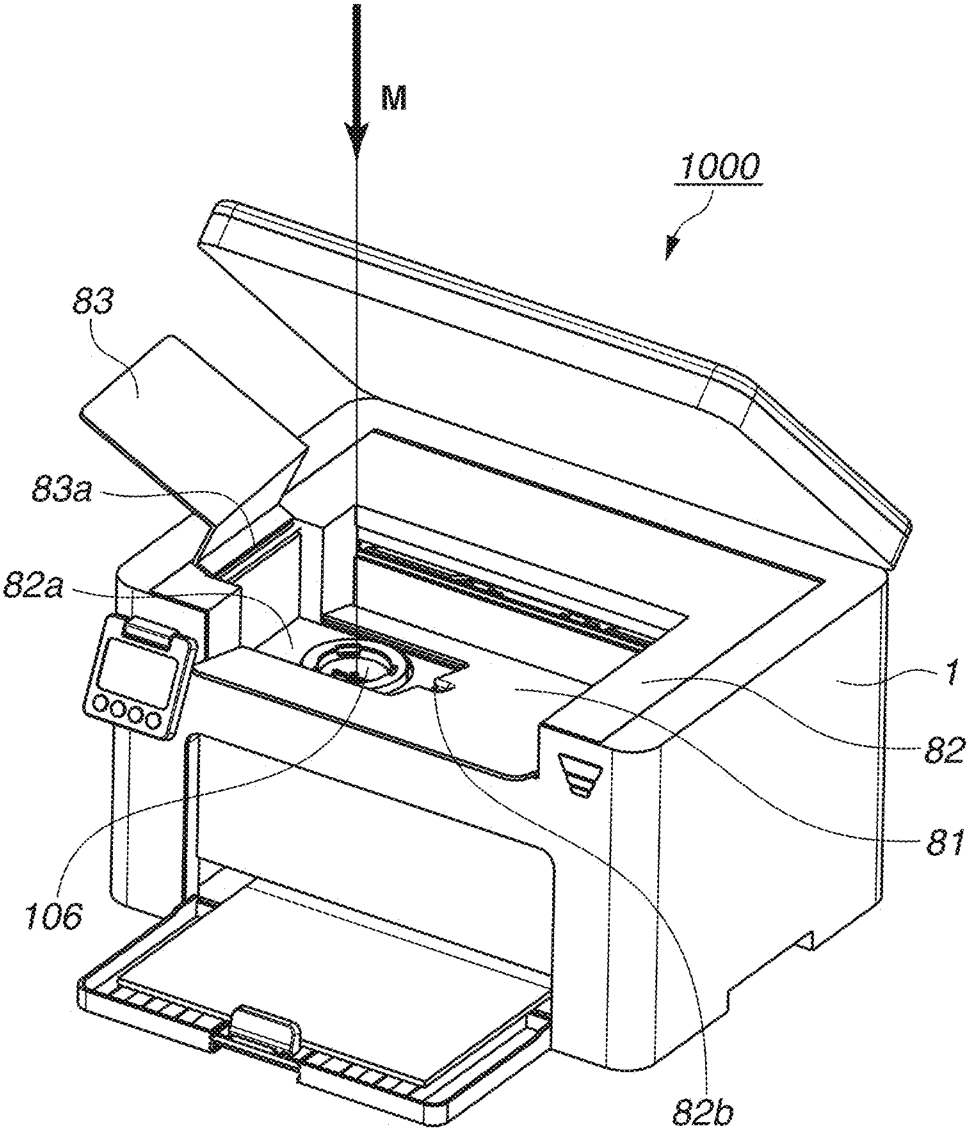
FIG. 3 is a perspective view illustrating an image forming apparatus.

The image forming system 1000 includes an image forming apparatus 1 and a toner pack 100 attachable to the image forming apparatus 1. FIG. 3 is a perspective view illustrating the image forming apparatus 1 to which the toner pack 100 is not attached.

The toner pack 100 is used by being attached to an attachment portion 106 of the image forming apparatus 1 illustrated in FIG. 3.

The toner pack 100 contains toner to be replenished to the image forming apparatus 1. Details of a configuration of the toner pack 100 will be described below. The toner pack 100 is attached to the image forming apparatus 1 along an attaching direction M illustrated in FIG. 3. In the present exemplary embodiment, the attaching direction M of the toner pack 100 is the gravitational direction. The attaching direction M of the toner pack 100 may be inclined relative to the gravitational direction.

<Image Forming Apparatus>

The image forming apparatus 1 forms an image on a recording medium P based on image information input from an external apparatus. Examples of the recording medium P include various kinds of sheet media made of different materials including paper such as so-called plain paper and thick paper, a plastic film such as a sheet for an overhead projector, a specially shaped sheet such as an envelope and an index sheet, and a cloth.

As illustrated in FIGS. 2A and 2B, the image forming apparatus 1 has a configuration described below. Specifically, the image forming apparatus 1 includes an image forming unit 10 for forming a toner image on the recording medium P, a pickup roller 65 for feeding the recording medium P to the image forming unit 10, a fixing unit 70 for fixing the toner image formed by the image forming unit 10 onto the recording medium P, and a discharge roller pair 80.

The image forming unit 10 includes a scanner unit 11, an electrophotographic process unit 20, and a transfer roller 12 for transferring the toner image formed on a photosensitive drum 21 of the process unit 20 onto the recording medium P. The process unit 20 includes the photosensitive drum 21, a charging roller 22, a pre-exposure unit 23, and a developing device 30 (developing unit or developing portion) including a developing roller 31.

The photosensitive drum 21 (image bearing member) is a photosensitive member formed in a cylindrical shape. The photosensitive drum 21 according to the present exemplary embodiment includes a photoconductive layer formed of an organic photosensitive member with a negative static charge property, on a base member made of aluminum formed in a drum shape. Further, the photosensitive drum 21 is rotationally driven by a motor at a predetermined process speed in a predetermined rotation direction (clockwise direction in FIG. 2A).

The charging roller 22 contacts the photosensitive drum 21 with a predetermined press-contact force to form a charging portion. The charging roller 22 also uniformly charges the surface of the photosensitive drum 21 to a predetermined potential by applying a target charging voltage from a charging high-voltage power source. In the present exemplary embodiment, the photosensitive drum 21 is charged to a negative polarity by the charging roller 22. To cause a stable electric discharge at the charging portion, the pre-exposure unit 23 removes the charge of the surface potential on the photosensitive drum 21 before reaching the charging portion.

The scanner unit 11 serving as an exposure unit reflects a laser beam corresponding to the image information input from the external apparatus using a rotating polygon mirror, to irradiate the photosensitive drum 21. In this way, the photosensitive drum 21 is exposed by the laser beam scanning the surface of the photosensitive drum 21. An electrostatic latent image corresponding to the image information is formed on the surface of the photosensitive drum 21 by this exposure. The scanner unit 11 may not be a laser scanner device. For example, a light-emitting diode (LED) exposure device having an LED array with a plurality of LEDs arranged therein along the lengthwise direction of the photosensitive drum 21 may be used.

The developing device 30 includes the developing roller 31 serving as a toner bearing member for bearing toner, a development container 32 (development frame) serving as a frame member for the developing device 30, and a supply roller 33 for supplying toner to the developing roller 31. The developing roller 31 and the supply roller 33 are rotatably supported by the development container 32. The developing roller 31 is also arranged in an opening portion of the development container 32 so as to oppose the photosensitive drum 21. The supply roller 33 is in contact with the developing roller 31 in a rotatable manner, and the toner contained in the development container 32 is supplied to the surface of the developing roller 31 by the supply roller 33. The supply roller 33 may not be employed if the developing device 30 is configured so as to be able to sufficiently supply toner to the developing roller 31.

The developing device 30 according to the present exemplary embodiment employs a contact developing method as a developing method. More specifically, a toner layer borne on the developing roller 31 is brought into contact with the photosensitive drum 21 at the developing portion (developing area) at which the photosensitive drum 21 and the developing roller 31 oppose each other. A developing voltage is applied to the developing roller 31 from a developing high-voltage power source. The toner borne on the developing roller 31 is transferred from the developing roller 31 to the surface of the photosensitive drum 21 according to a potential distribution on the surface of the photosensitive drum 21 in a state of the developing voltage being applied, to develop the electrostatic latent image to a toner image. In the present exemplary embodiment, a reversal developing method is employed. More specifically, a toner image is formed by the toner attaching to the surface area of the photosensitive drum 21 with the charged amount reduced by being exposed in an exposure step after being charged in a charging step.

In the present exemplary embodiment, toner with a particle diameter 6 μm (micrometers) and a negative polarity as a regular charge polarity is used. For example, polymerized toner produced by a polymerization method is employed as the toner in the present exemplary embodiment. The toner according to the present exemplary embodiment does not include a magnetic component, and is a so-called a non-magnetic mono-component toner, which is borne on the developing roller 31 mainly by an intermolecular force or an electrostatic force (image force). However, a mono-component toner containing a magnetic component may also be used. Other than toner particles, the mono-component toner may contain additives, such as wax and silica fine particles, for adjusting fluidity and charging performance of the toner. Alternatively, a two-component toner containing a non-magnetic toner and a magnetic carrier may also be used as the toner. In a case where the magnetic toner is used, for example, a cylindrical-shape developing sleeve with a magnet arranged inside thereof is used, as a toner bearing member.

The development container 32 includes a toner storage chamber 36 (second storage portion or main body storage portion) for storing toner. Inside the toner storage chamber 36, an agitation member 34 (toner conveyance member) is provided. The agitation member 34 is rotationally driven by a motor (not illustrated) to agitate the toner in the development container 32 and carry the toner toward the developing roller 31 and the supply roller 33. The agitation member 34 also has a role of circulating the toner not used for the development and ripped off from the developing roller 31 in the development container 32 to uniformize the toner therein. The agitation member 34 is not limited to have the rotational configuration. For example, an agitation member with a swinging configuration may also be employed.

In the opening portion of the development container 32 in which the developing roller 31 is arranged, a developing blade 35 for regulating an amount of toner borne on the developing roller 31 is arranged. The toner supplied to the surface of the developing roller 31 passes through the opposing portion between the developing roller 31 and the developing blade 35 along with the rotation of the developing roller 31, is uniformly and thinly layered, and is negatively charged by frictional charging.

Next, an image forming operation of the image forming apparatus 1 will be described. When an instruction to form an image is input to the image forming apparatus 1, the image forming unit 10 starts an image forming process based on image information input from an external computer connected to the image forming apparatus 1. The scanner unit 11 emits a laser beam to the photosensitive drum 21 based on the input image information. At this time, the photosensitive drum 21 is charged in advance by the charging roller 22, and an electrostatic latent image is formed on the photosensitive drum 21 by being irradiated with the laser beam. The electrostatic latent image is then developed by the developing roller 31, and a toner image is formed on the photosensitive drum 21.

In parallel with the above-described image forming process, the recording medium P is fed by the pickup roller 65, and conveyed to a transfer nip portion formed by the transfer roller 12 and the photosensitive drum 21.

A transfer voltage is applied to the transfer roller 12 from a transfer high-voltage power source to transfer the toner image borne on the photosensitive drum 21 onto the recording medium P. The recording medium P on which the toner image is transferred is heated and pressurized when passing through the fixing unit 70. In this way, the toner particles are melted and then fixed, and the toner image is thereby fixed on the recording medium P. The recording medium P having passed through the fixing unit 70 is discharged outside the image forming apparatus 1 (outside the apparatus) by the discharge roller pair 80 serving as a discharge unit, and stacked on a discharge tray 81 serving as a stacking portion formed at an upper portion of the image forming apparatus 1.

A top cover 82 serving as a stacking tray is provided at an upper portion of the image forming apparatus 1. On the upper surface of the top cover 82, the discharge tray 81 serving as a stacking surface is formed. The top cover 82 is provided with an open/close member 83 supported to be openable and closable about a pivot shaft 83*a* extending in the front-back direction as illustrated in FIGS. 2B and 3. In the discharge tray 81 of the top cover 82, an opening portion 82*a* opening upward is formed. As illustrated in FIG. 3, when the open/close member 83 is located at an open position described below, the attachment portion 106 for attaching the toner pack 100 thereto is exposed through the opening portion 82*a*.

The open/close member 83 is configured to be movable between a closed position at which the attachment portion 106 is covered so that the toner pack 100 cannot be attached to the image forming apparatus 1, and an open position at which the attachment portion 106 is exposed so that the toner pack 100 can be attached to the image forming apparatus 1. The open/close member 83 functions as a part of the discharge tray 81 at a closed position of the open/close member 83. The open/close member 83 and the opening portion 82*a* are formed on the left side of the discharge tray 81 when viewed from the front side of the image forming apparatus 1. Herein, the front side of the image forming apparatus 1 is an upstream side of the image forming apparatus 1 in a direction in which the recording medium P is fed by the pickup roller 65. The open/close member 83 is opened to the left direction by a user standing in front of the image forming apparatus 1 by placing the user's finger in a groove portion 82*b* provided on the top cover 82 to pull the open/close member 83.

The opening portion 82*a* of the discharge tray 81 is open so as to expose the attachment portion 106 formed at the upper portion of the image forming apparatus 1, and the user can access the attachment portion 106 when the open/close member 83 is opened. In the present exemplary embodiment, a direct replenishment method is employed, which is a method of replenishing toner by the user to the developing device 30 from the toner pack 100 attached to the attachment portion 106 in a state where the developing device 30 is attached to the image forming apparatus 1. In the state where the toner pack 100 is attached to the attachment portion 106 of the image forming apparatus 1, at least a part of the toner pack 100 is exposed outside the image forming apparatus 1 (see FIG. 2A).

In this way, the user does not need to take out the process unit 20 from the image forming apparatus 1 to replace the process unit 20 with a new one, in a case where the toner remaining level of the process unit 20 becomes low. Since the whole process unit 20 is not replaced, it is possible to replenish toner to the development container 32 less expensively because of fewer replacement parts. In such a direct replenishment method, various kinds of rollers or gears do not need to be replaced. Accordingly, this method can also reduce the cost compared with a case where only the developing device 30 of the process unit 20 is replaced.

<Attachment Portion for Toner Pack>

First, a configuration of the attachment portion 106 will be described with reference to FIGS. 4A to 9B. In the present exemplary embodiment, the attachment portion 106 is a unit for attaching the toner pack 100 thereto.

Figures 4A, 4B:
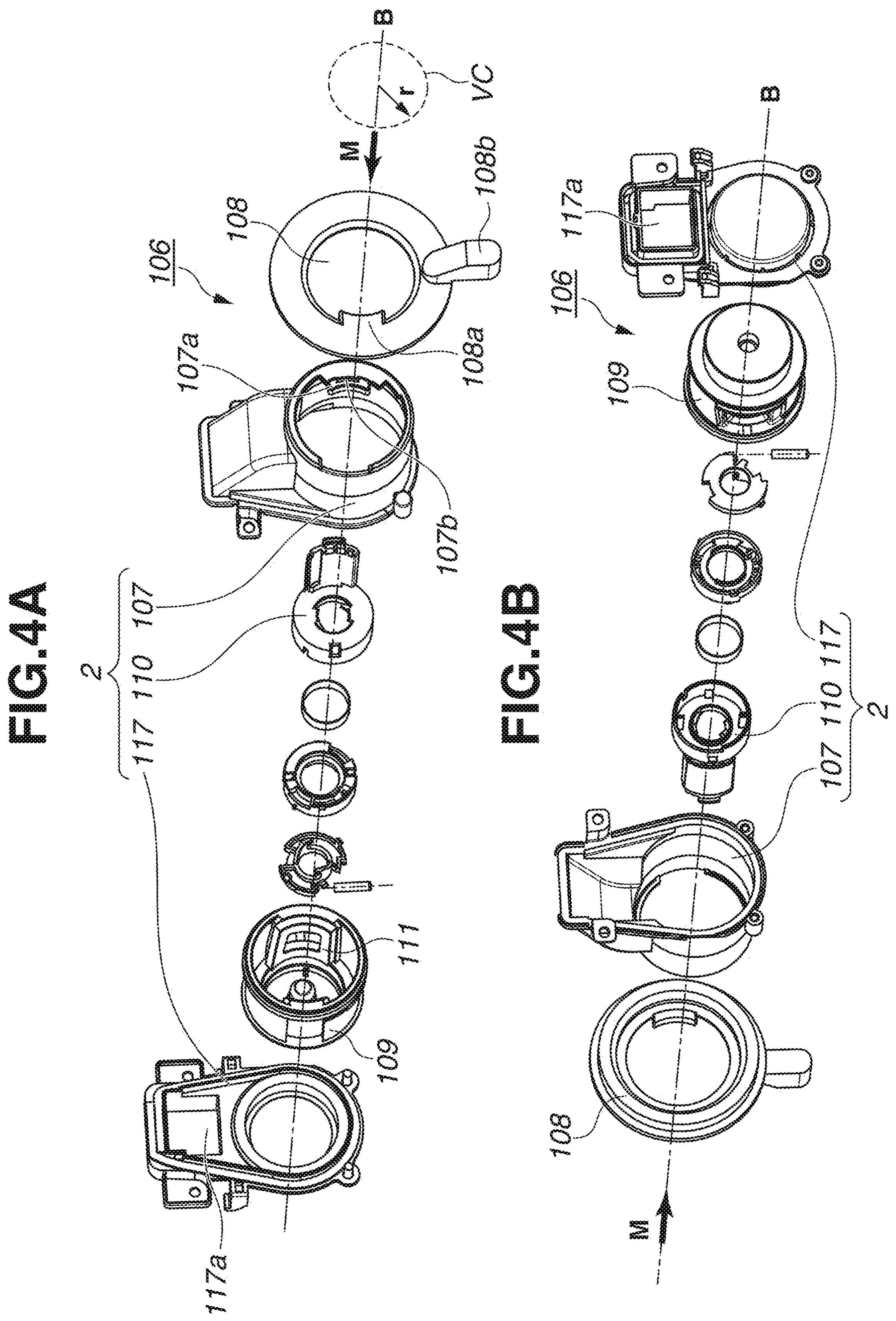
FIGS. 4A and 4B are exploded perspective views illustrating the attachment portion.
Figure 5B:
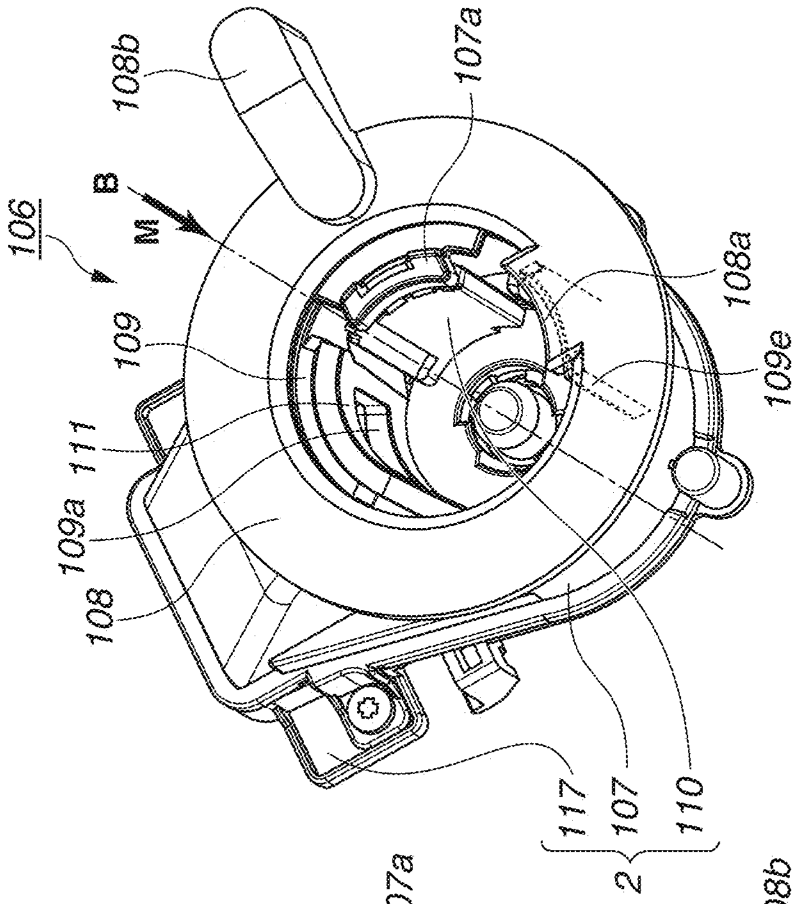
FIGS. 5A and 5B are perspective views illustrating an external appearance of the attachment portion.
Figure 5A:
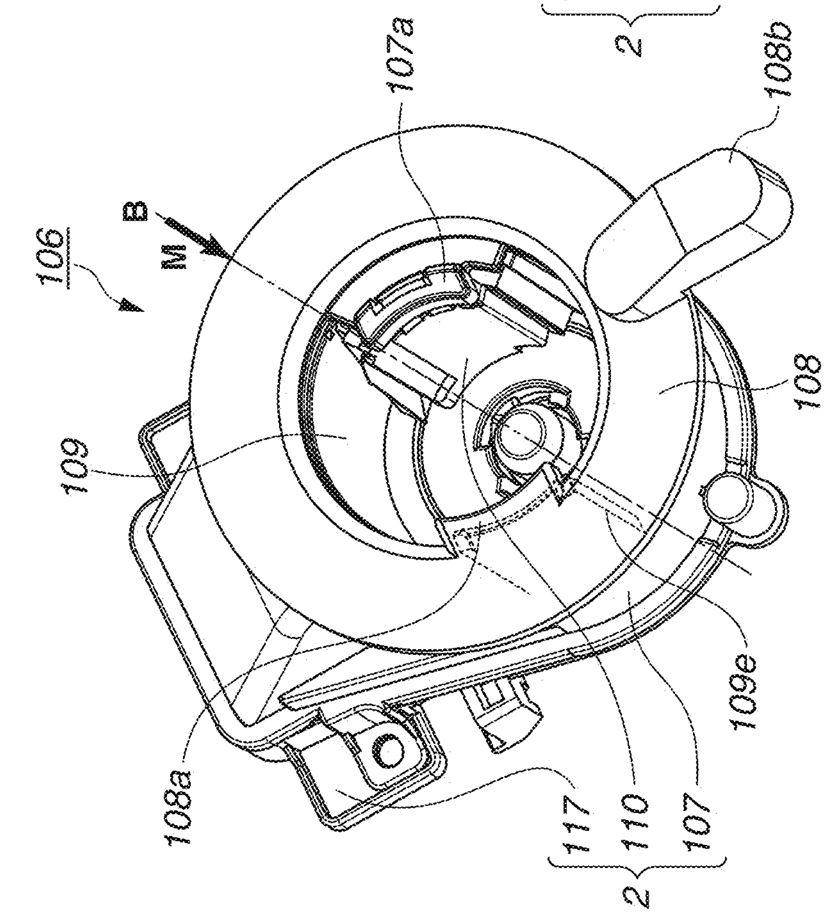
Figure 6B:
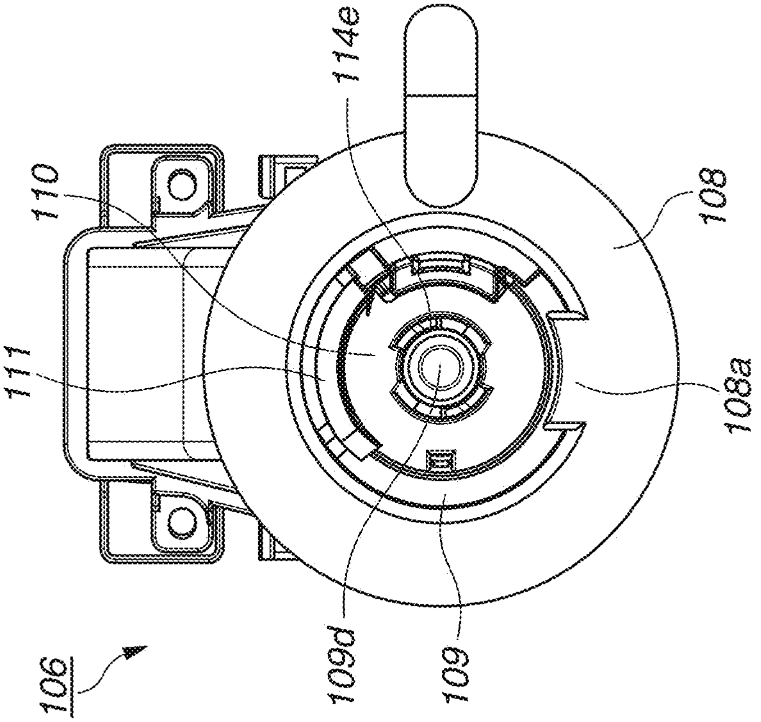
FIGS. 6A and 6B are diagrams illustrating the attachment portion viewed from above.
Figure 6A:
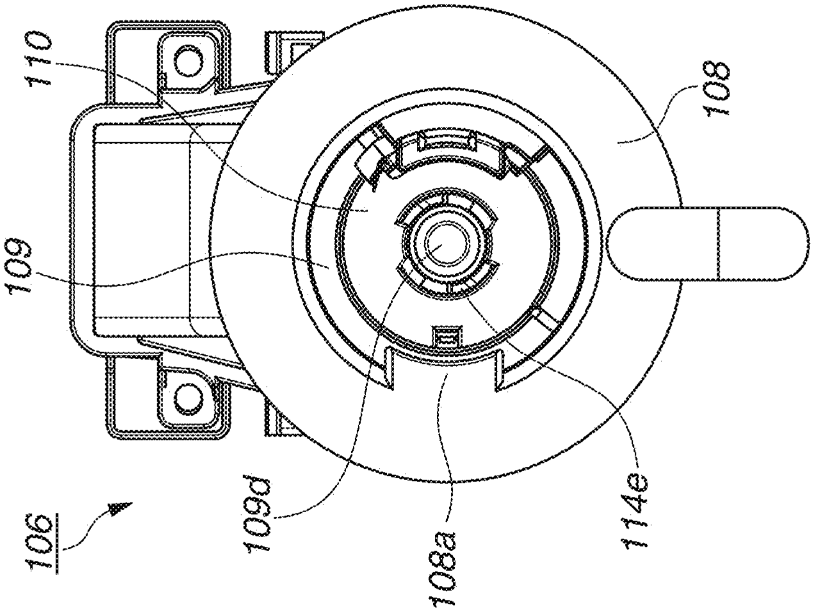
Figure 7:
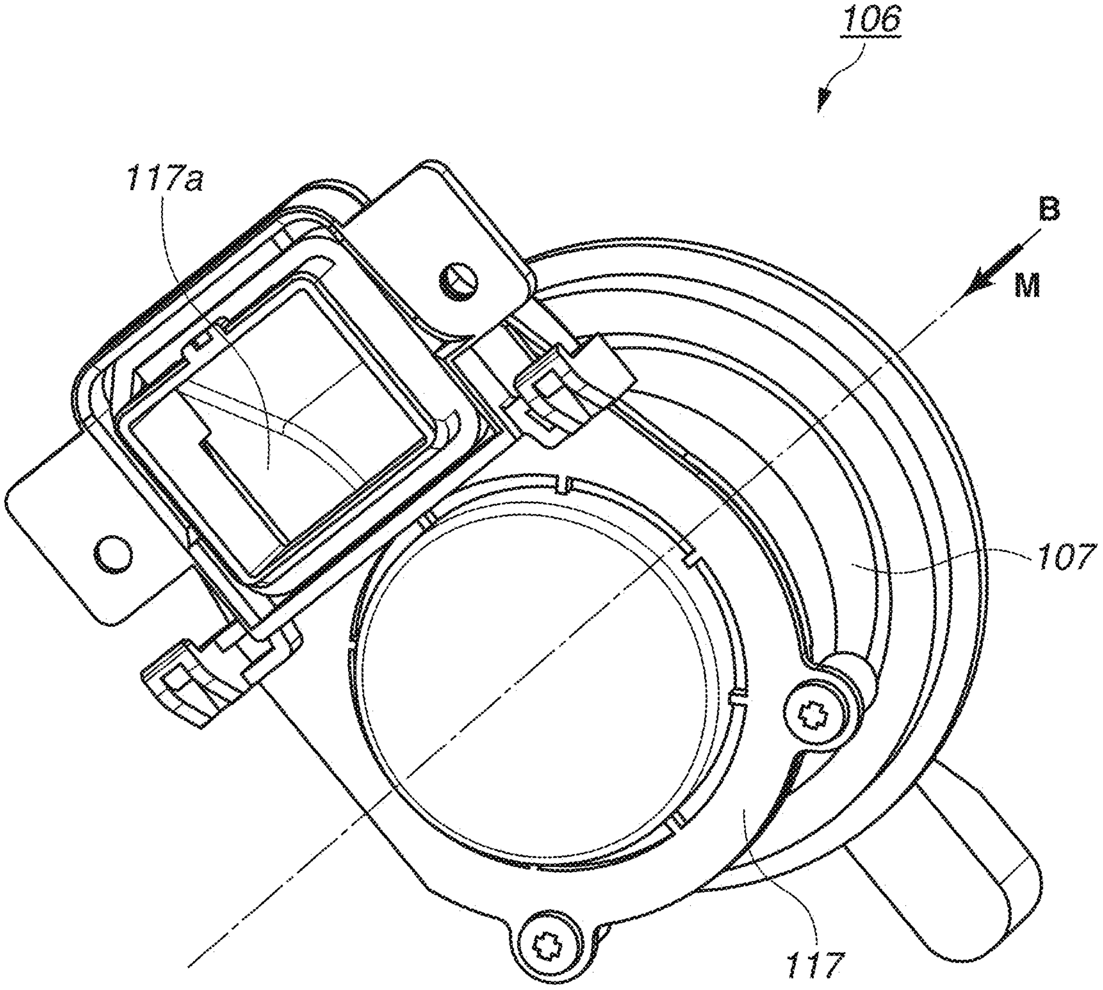
FIG. 7 is a diagram illustrating the attachment portion viewed from below.

FIG. 4A is an exploded perspective view illustrating the attachment portion 106. FIG. 4B is an exploded perspective view illustrating the attachment portion 106 viewed from an opposite direction to a direction in FIG. 4A. FIGS. 5A and 6A are respectively a perspective view illustrating an external appearance of the attachment portion 106 when an operation lever 108 is at a closed position, and a diagram illustrating the attachment portion 106 viewed from the attaching direction M. FIGS. 5B and 6B are respectively a perspective view illustrating an external appearance of the attachment portion 106 of the image forming apparatus 1 when the operation lever 108 is at an open position, and a diagram illustrating the attachment portion 106 viewed from the attaching direction M. FIG. 7 is a perspective view illustrating the attachment portion 106 viewed from a downstream side in the attaching direction M.

Figure 8B:
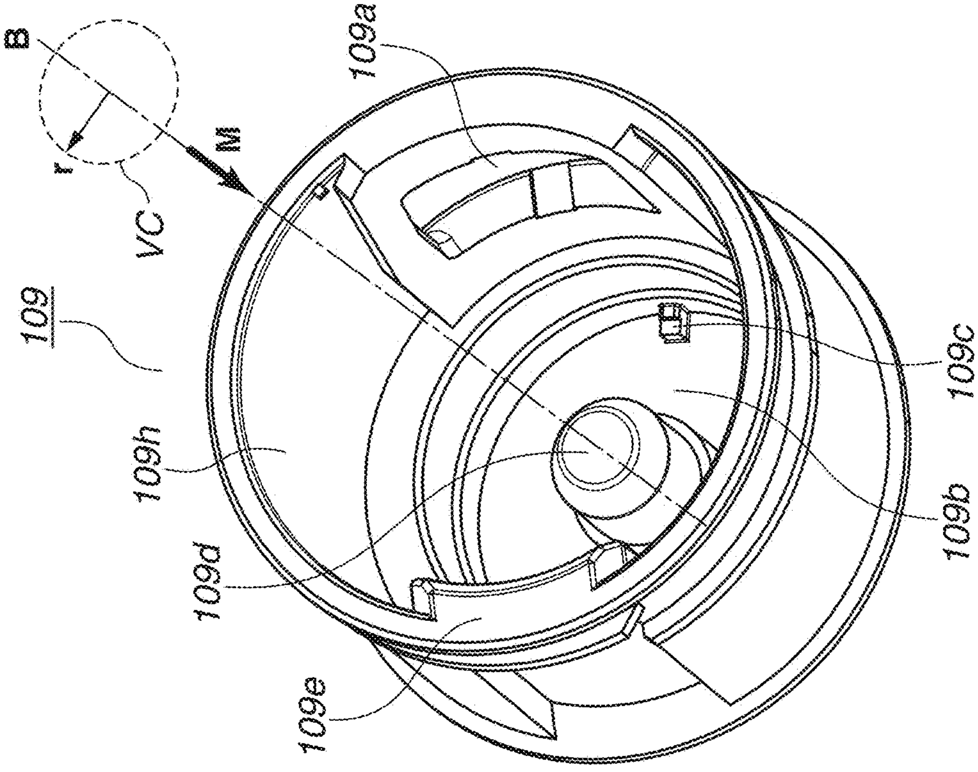
FIGS. 8A and 8B are perspective views illustrating an apparatus side shutter.
Figure 8A:
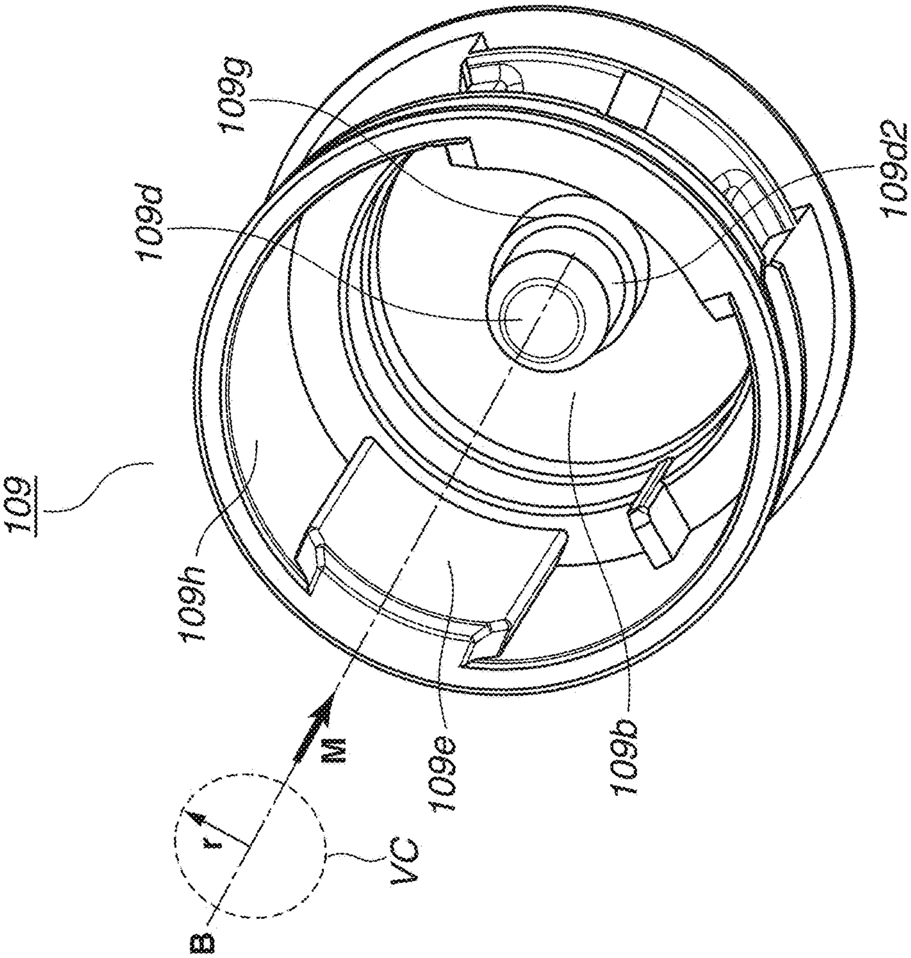

FIG. 8A is a perspective view illustrating an apparatus side shutter 109 viewed from an upstream side in the attaching direction M. FIG. 8B is a perspective view illustrating the apparatus side shutter 109 viewed from a viewpoint different from that in FIG. 8A.

Figure 9B:
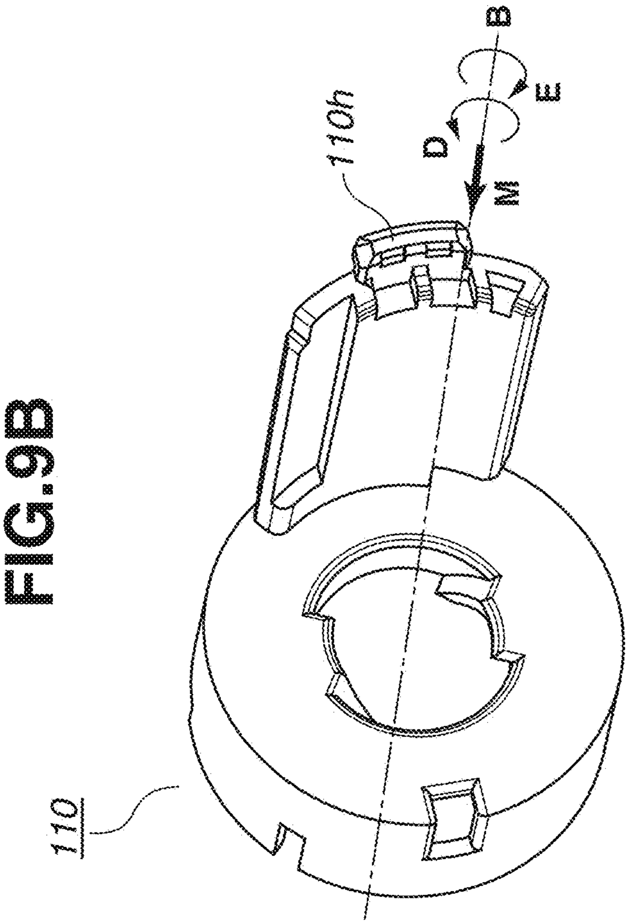
FIGS. 9A and 9B are perspective views illustrating a cover.
Figure 9A:
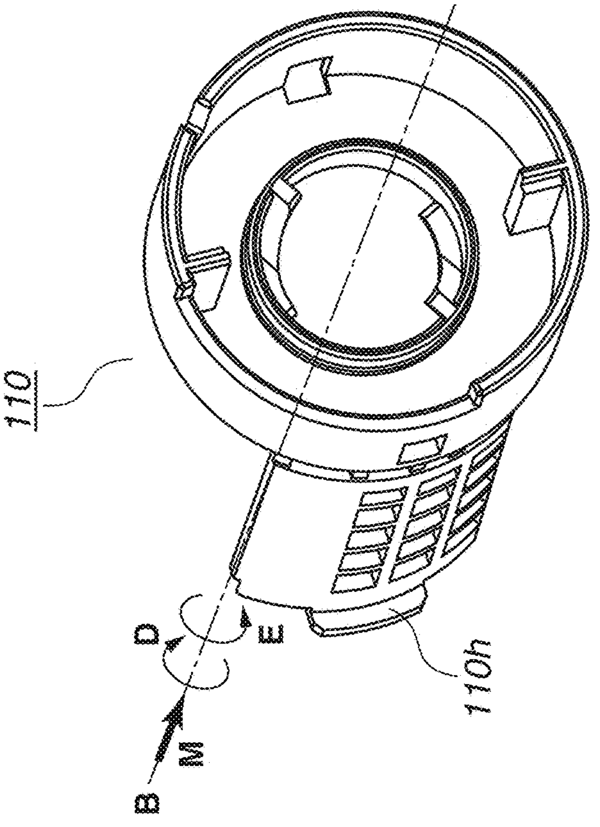

FIG. 9A is a perspective view illustrating a cover 110 viewed from a downstream side of the cover 110 in the attaching direction M. FIG. 9B is a perspective view illustrating the cover 110 viewed from the upstream side of the attaching direction M.

The attachment portion 106 illustrated in FIGS. 3, 5A, and 5B is provided with a base frame member 2 including a first frame member 107, a second frame member 117, and the cover 110. The cover 110 and the second frame member 117 are fixed to the first frame member 107.

As illustrated in FIGS. 9A and 9B, the cover 110 includes an engaged portion **110*h* engaged with an engaging portion 107*b* (see FIG. 4A) of the first frame member 107 so as not to rotate relative to the first frame member 107 about a rotation axis line B. The first frame member 107, the cover 110, and the second frame member 117 may be integrally configured, not separately configured. As illustrated in FIGS. 4A, 4B, and 7, the second frame member 117 is provided with an apparatus side opening 117*a* (frame member opening or reception opening), and the apparatus side opening 117*a* communicates with the toner storage chamber 36 of the developing device 30 (see FIG. 2**A).

The operation lever 108 and the apparatus side shutter 109 (second shutter) are respectively attached to the base frame member 2 to be rotatable about the rotation axis line B (center axis line).

The first frame member 107 is provided with a positioning member **107*a*. The positioning member 107*a* protrudes inward beyond an inner circumferential surface around the rotation axis line B of the first frame member 107 in a radial direction r of a virtual circle VC with the rotation axis line B as its center. The operation lever 108 is provided with a drive force transmission portion 108*a* (lever protruding portion) and an operation portion 108*b*. As illustrated in FIG. 4A, the drive force transmission portion 108*a* of the operation lever 108 is a protruding portion protruding inward beyond the inner circumferential surface around the rotation axis line B of the operation lever 108** in the radial direction r of the virtual circle VC with the rotation axis line B as its center.

The apparatus side shutter 109 is a cylindrical-shaped member that is open at an upper side thereof in a state where the apparatus side shutter 109 is attached to the image forming apparatus 1. As illustrated in FIGS. 8A and 8B, a reception port **109*a* (second shutter opening or apparatus side shutter opening) is provided on a side surface of the apparatus side shutter 109 extending in a direction of the rotation axis line B, and has a bottom surface 109*b* provided with a regulated rib 109*c* (rotation regulated portion) thereon. The apparatus side shutter 109 further includes a center boss 109*d* (positioning shaft or shaft portion), a driven force transmission portion 109*e* (pressed portion or apparatus side shutter protruding portion), a pack contact surface 109*g* (attaching direction positioning surface), and an inner circumferential surface 109*h* (radial direction positioning surface). The apparatus side shutter 109 is configured to be rotatable relative to the base frame member 2** around the rotation axis line B.

The regulated rib **109*c* protrudes upward from the bottom surface 109*b* in the direction of the rotation axis line B. As illustrated in FIG. 8A, the driven force transmission portion 109*e* is a protruding portion protruding inward in the radial direction r of the virtual circle VC with the rotation axis line B as its center. An apparatus side seal 111 is attached around the reception port 109*a* (see FIG. 5**B).

In the present exemplary embodiment, the apparatus side shutter 109 is configured to be rotatable relative to the base frame member 2 so as to move between a closed position at which the reception port **109*a* is covered by the apparatus side seal 111 and the cover 110, and an open position at which the reception port 109*a* is open, not covered by the cover 110. The closed position is the position illustrated in FIGS. 5A and 6A, and is a position (non-communication position) at which the reception port 109*a* of the apparatus side shutter 109 does not communicate with the apparatus side opening 117*a* of the second frame member 117. The open position is the position illustrated in FIGS. 5B and 6B, and is a position (communication position) at which the reception port 109*a* of the apparatus side shutter 109 communicates with the apparatus side opening 117*a* of the second frame member 117. The apparatus side shutter 109 moves to the open position, to allow toner to be replenished (supplied) from the toner pack 100 to the toner storage chamber 36 of the developing device 30 via the reception port 109*a* (see FIG. 8**B).

Since the operation lever 108 and the apparatus side shutter 109 are not connected in drive force, the apparatus side shutter 109 does not rotate even when the operation lever 108 is operated in a state where the toner pack 100 is not attached.

<Toner Pack>

Figure 10A:
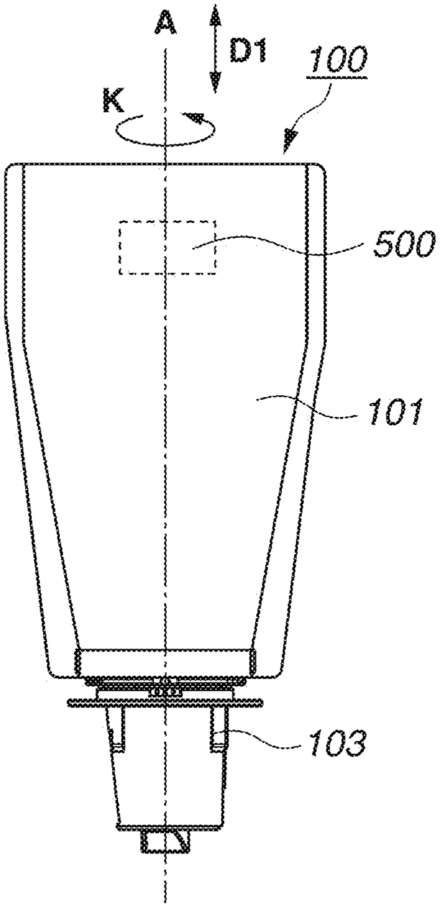
FIGS. 10A and 10B are front views illustrating the toner pack.
Figure 10B:
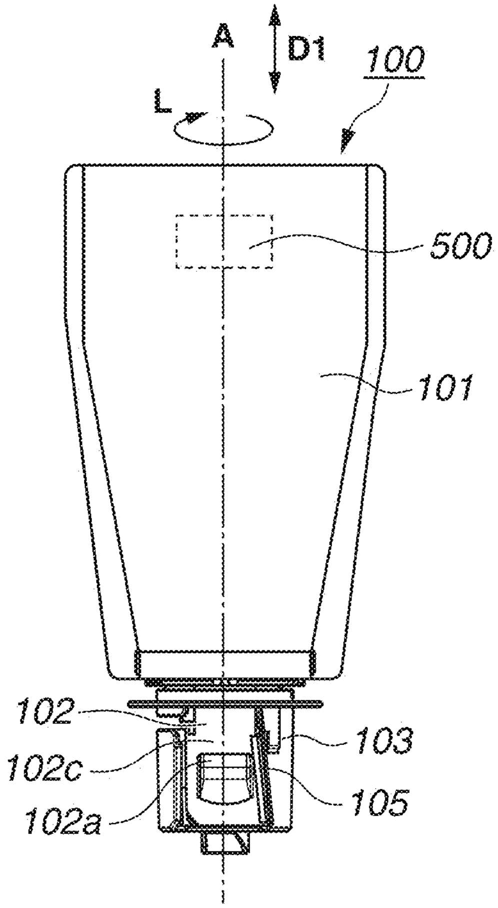
Figure 11:
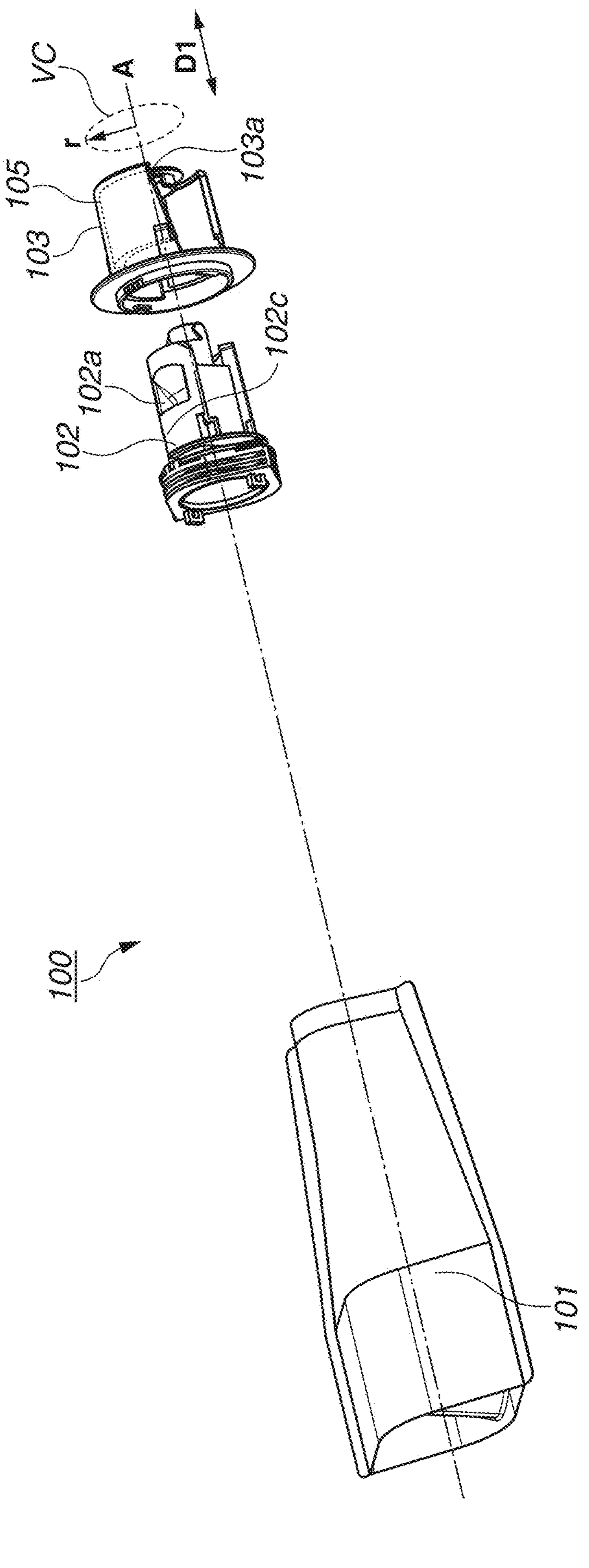
FIG. 11 is an exploded perspective view illustrating the toner pack.

A basic configuration of the toner pack 100 will be described with reference to FIGS. 10A, 10B, and 11. FIG. 10A is a front view illustrating the toner pack 100 when a pack side shutter 103 is at a closed position. FIG. 10B is a front view illustrating the toner pack 100 when the pack side shutter 103 is at an open position. FIG. 11 is an exploded perspective view illustrating the toner pack 100.

The toner pack 100 includes a bag (pouch) provided with an opening portion and a container 101 (first storage portion) for storing toner, a nozzle 102 (nozzle portion, pipe, tube, valve, or discharge portion), and the pack side shutter 103 (container shutter or rotation member).

As illustrated in FIGS. 10A and 10B, the container 101 is provided on a first end portion side in a first direction D1, and the nozzle 102 and the pack side shutter 103 are provided on a second end portion side that is opposite to the first end portion side in the first direction D1. The container 101 is a pouch formed of a pouch-processed polypropylene sheet (film), which is a flexible resin sheet. The nozzle 102 is formed of a polypropylene film that is thicker than that of the container 101.

A discharge port **102*a* (nozzle opening or first opening) configured to communicate with the inside of the container 101 is provided in a side surface 102*c* (first outer surface) of the nozzle 102 extending along the first direction D1. The toner stored in the container 101 can be discharged outside the toner pack 100 via the discharge port 102*a*. The nozzle 102 may also be integrally formed with the container 101. A seal may also be provided between the container 101 and the discharge port 102*a* of the nozzle 102, and the container 101 and the discharge port 102*a*** may communicate with each other when the seal is removed.

The pack side shutter 103 (rotation member) is provided on an external side of the side surface **102*c* of the nozzle 102. The pack side shutter 103 is attached to be rotatable around a rotation axis line A (first rotation axis line) extending along the first direction D1, and has an opening 103***a* (rotation member opening or first shutter opening) as illustrated in FIG. 11. The pack side shutter 103 is provided on an external side of the side surface 102*c* in a radial direction r of a virtual circle VC with the rotation axis line A as its center. The side surface 102*c* of the nozzle 102 is a curved surface protruding outside in the radial direction r of the virtual circle VC with the rotation axis line A as its center. The inside surface of the pack side shutter 103 (surface opposing the side surface 102*c*) is a curved surface formed along the side surface 102*c* of the nozzle 102, and a pack side seal 105 with a substantially rectangular shape is attached thereto. The side surface 102*c* of the nozzle 102 is also a surface extending along the rotation axis line A.

As illustrated in FIGS. 10A and 10B, the pack side shutter 103 is configured to be rotatable around the rotation axis line A between a closed position at which the pack side seal 105 seals the discharge port 102*a* of the nozzle 102, and an open position at which the pack side seal 105 does not seal the discharge port 102*a* of the nozzle 102. When the pack side shutter 103 is at its open position, the discharge port 102*a* of the nozzle 102 is exposed through the opening 103*a*.

FIGS. 10A and 10B illustrate the states where the pack side shutter 103 is at the closed position and at the open position, respectively. As illustrated in FIG. 10A, the pack side shutter 103 at the closed position reaches the open position illustrated in FIG. 10B, when the pack side shutter 103 is rotated in an arrow K direction (first rotation direction) around the rotation axis line A. In contrast, the pack side shutter 103 reaches the closed position, when the pack side shutter 103 is rotated around the rotation axis line A in an arrow L direction (second rotation direction) from the open position. In the rotation operation of the pack side shutter 103, the pack side shutter 103 frictionally slides against the side surface 102*c* of the nozzle 102 via the pack side seal 105.

Detailed configurations of the nozzle 102 and the pack side shutter 103 will now be described with reference to FIGS. 12A to 14. An arrow N direction is a direction from the container 101 to the nozzle 102, and an arrow U direction is the opposite direction thereof. The arrow N and the arrow U directions are directions parallel to the rotation axis line A.

Figure 12B:
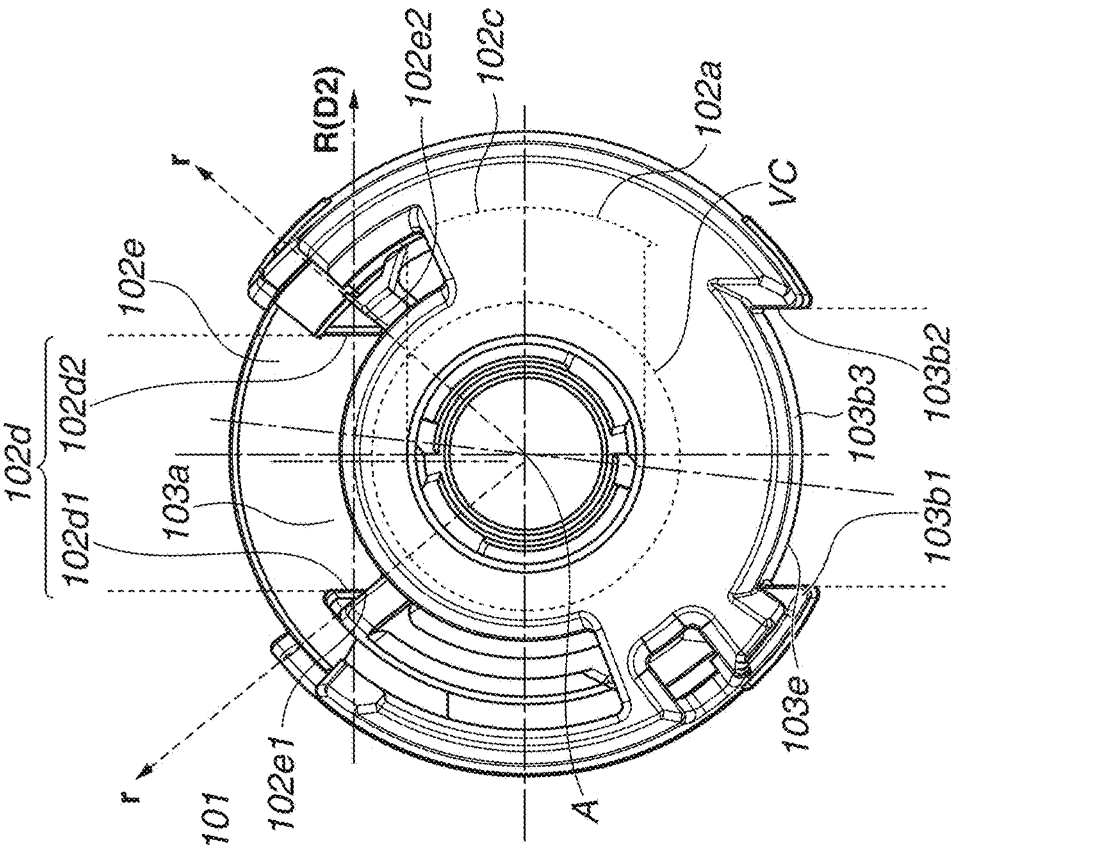
FIGS. 12A and 12B are respectively a perspective view and a bottom view illustrating a vicinity of a nozzle in a state where a pack side shatter is closed.
Figure 12A:
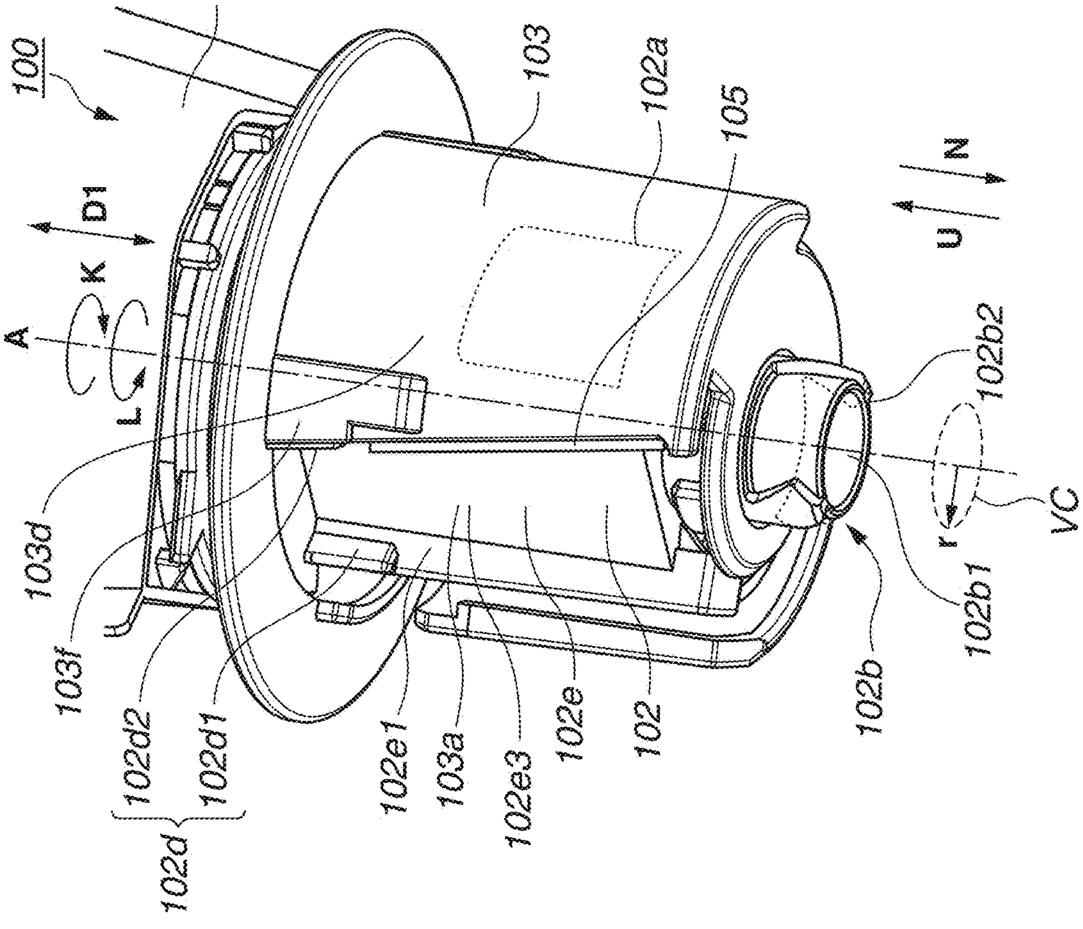
Figure 13A:
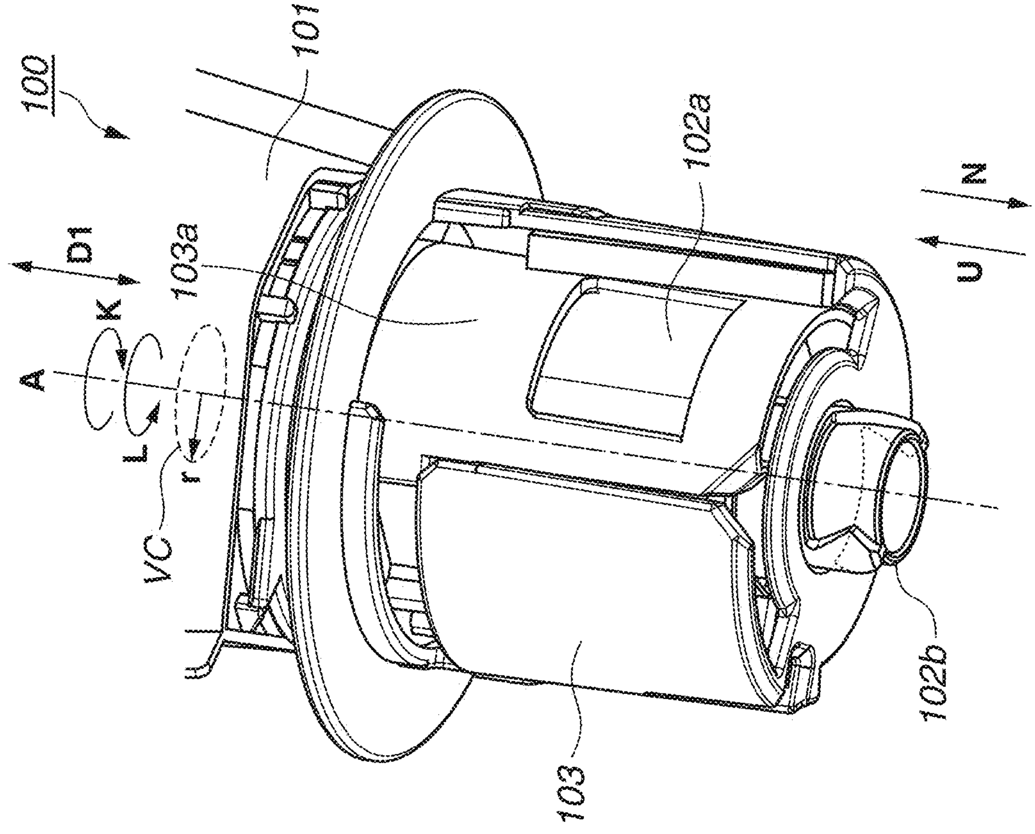
FIGS. 13A and 13B are respectively a perspective view and a bottom view illustrating the vicinity of the nozzle in a state where the pack side shatter is open.
Figure 13B:
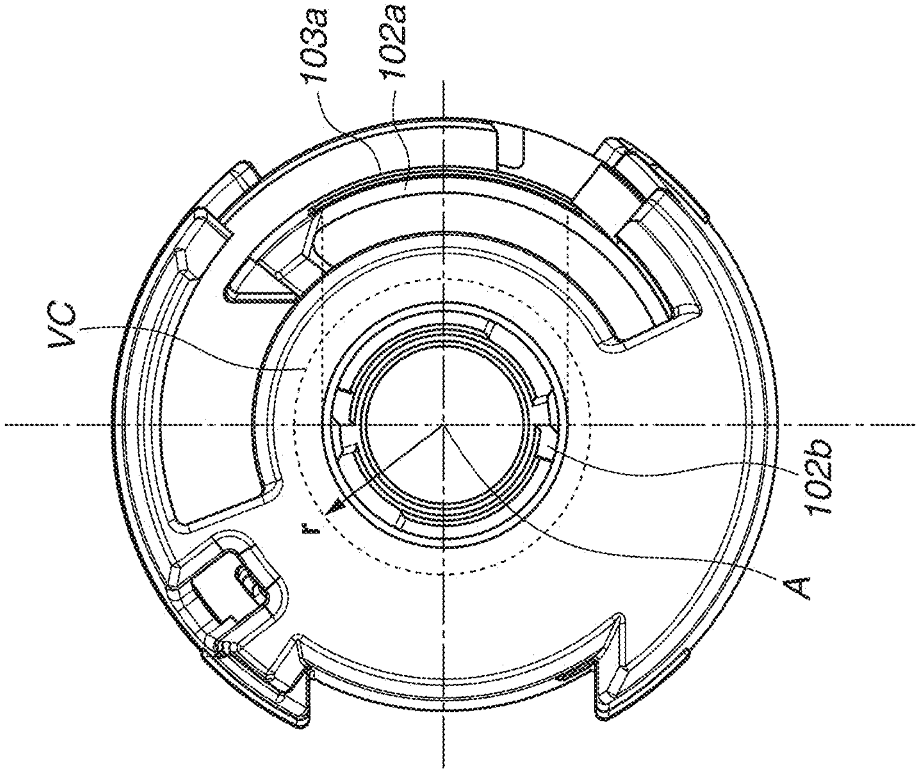

FIG. 12A is an expanded perspective view illustrating a vicinity of the nozzle 102 when the pack side shutter 103 is at the closed position. FIG. 12B is a bottom view illustrating the toner pack 100 viewed in the arrow U direction in FIG. 12A. FIG. 13A is an expanded perspective view illustrating a vicinity of the nozzle 102 when the pack side shutter 103 is at the open position. FIG. 13B is a bottom view illustrating the toner pack 100 viewed in the arrow U direction in FIG. 13A.

As illustrated in FIGS. 12A and 12B, the nozzle 102 is provided with a positioned portion 102*d* having a surface 102*d*1 (first nozzle surface or first opposing surface) extending in a direction intersecting with an arrow R direction (second direction D2), and a surface 102*d*2 (second nozzle surface or second opposing surface), which are arranged to oppose each other with an interval in the arrow R direction. As illustrated in FIG. 12B, the surface 102*d*1 and the surface 102*d*2 in the present exemplary embodiment extend in a direction perpendicular to the arrow R direction, and are parallel with each other. In other words, the arrow R direction is a direction normal to the surface 102*d*1 and the surface 102*d*2. The positioned portion 102*d* engages with the positioning member 107*a* (see FIG. 4A) of the first frame member 107, when the toner pack 100 is attached to the attachment portion 106. In this way, the nozzle 102 is positioned with respect to the first frame member 107 (base frame member 2) of the attachment portion 106 in the arrow R direction (see FIG. 12B).

Figure 15:
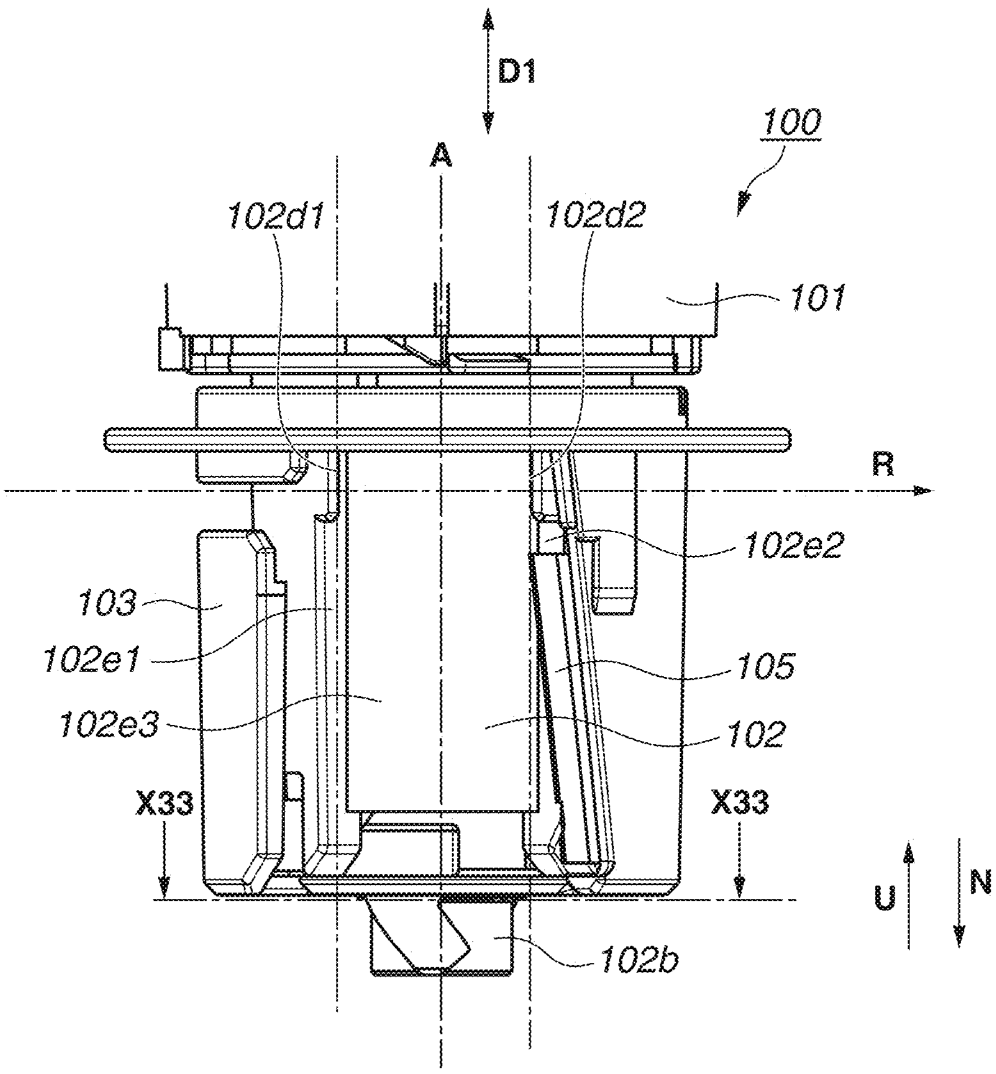
FIG. 15 is a front view illustrating the vicinity of the nozzle.

As illustrated in FIGS. 12A, 12B, and 15, a surface 102*e*1 and a surface 102*e*2 are provided on the downstream side in the N direction of the surface 102*d*1 and the surface 102*d*2 in the rotation axis line A direction, respectively. As illustrated in FIG. 12B, the surface 102*e*1 and the surface 102*e*2 extend in the radial direction r of the virtual circle VC with the rotation axis line A as its center.

In FIG. 15, a side surface 102*e*3 (second outer surface) is provided between the surface 102*d*1 and the surface 102*d*2, and between the surface 102*e*1 and the surface 102*e*2 in the arrow R direction. The side surface 102*e*3 is recessed inward from the side surface 102*c* in the radial direction r. The surface 102*d*1, the surface 102*d*2, and the side surface 102*e*3, and the surface 102*e*1, the surface 102*e*2, and the side surface 102*e*3 form a recessed portion 102*e* (nozzle recessed portion, see FIG. 12A).

The surface 102*d*1 and the surface 102*d*2 may not be parallel with each other as the present exemplary embodiment. The surface 102*d*1 and the surface 102*d*2 may be surfaces extending in the radial direction r of the virtual circle VC with the rotation axis line A as its center.

As illustrated in FIG. 12A, a side surface 103*d* (first rotation member outer surface) of the pack side shutter 103 is provided with the opening 103*a* (rotation member opening), when viewed in a direction orthogonal to the rotation axis line A direction (first direction D1). In FIG. 12A, when the pack side shutter 103 is at the closed position, at least a part of the recessed portion 102*e* of the nozzle 102 is exposed through the opening 103*a*. This is to engage the recessed portion 102*e* (surface 102*d*1 and surface 102*d*2) with the positioning member 107*a* of the attachment portion 106, when the toner pack 100 is attached to the attachment portion 106 in a state where the pack side shutter 103 is closed.

As illustrated in FIG. 12B, in a case where the pack side shutter 103 is at the closed position, a driven force transmission portion 103*e* (rotation member recessed portion) is provided on an opposite side of the recessed portion 102*e* of the nozzle 102 (opening 103*a* of pack side shutter 103) across the rotation axis line A when viewed in the rotation axis line A direction (first direction D1). A surface 103*b*1 and a surface 103*b*2 of the driven force transmission portion 103*e* both extend in a direction perpendicular to the arrow R direction. FIG. 13A is an expanded perspective view illustrating a vicinity of the pack side shutter 103 viewed from a side where the driven force transmission portion 103*e* is located. A side surface 103*b*3 (second rotation member outer surface) recessed inward more than the side surface 103*d* in the radial direction r is provided between the surfaces 103*b*1 and 103*b*2. The driven force transmission portion 103*e* is configured by the surface 103*b*1, the surface 103*b*2, and the side surface 103*b*3.

Figure 14:
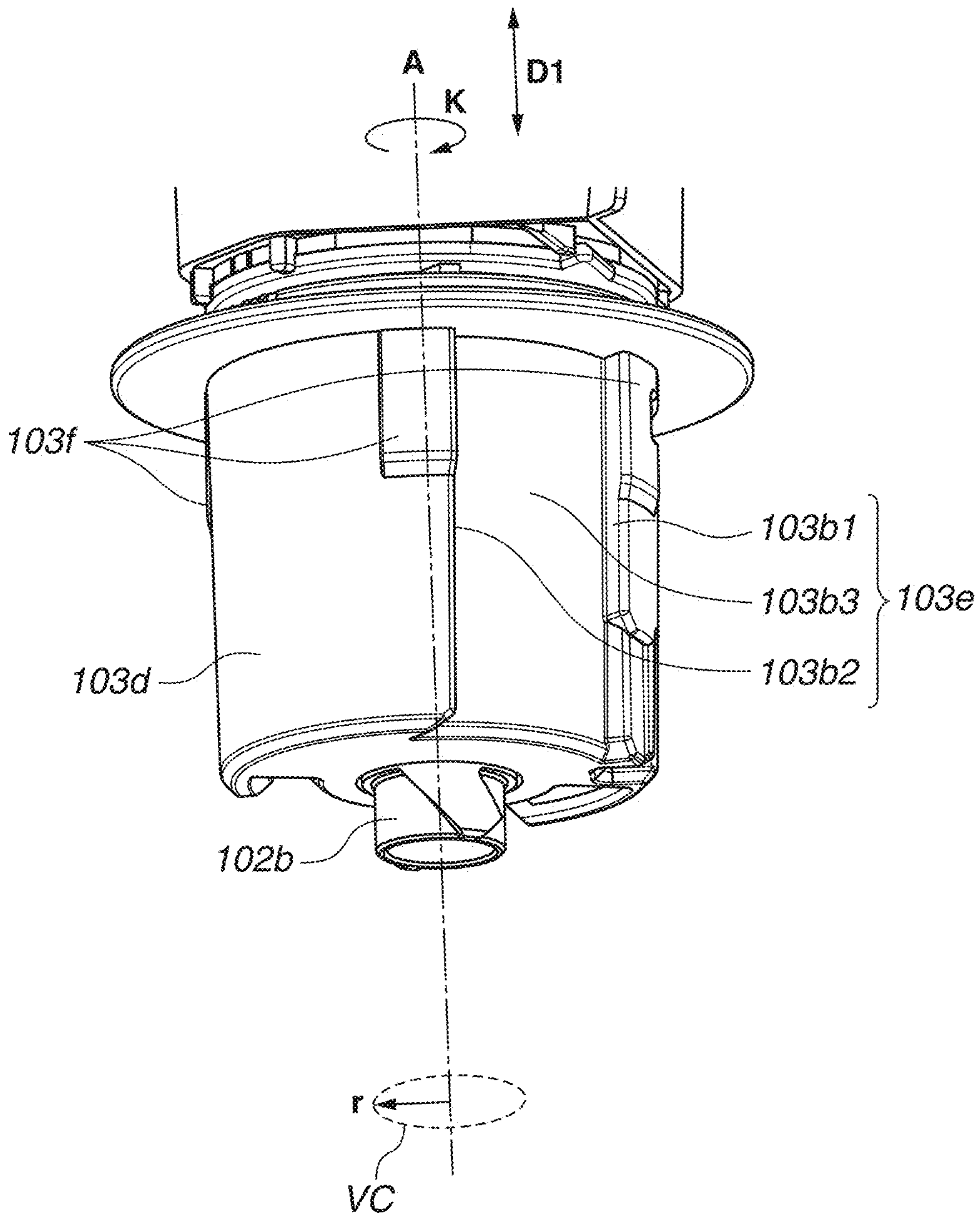
FIG. 14 is a perspective view illustrating a back side of the vicinity of the nozzle.

As illustrated in FIGS. 12A, 12B, and 14, the pack side shutter 103 has radial direction positioning portions 103*f* protruding outward more than the side surface 103*d* in the radial direction r. The radial direction positioning portions 103*f* are provided on the upstream side of the pack side shutter 103 in the N direction of the rotation axis line A direction. The radial direction positioning portions 103*f* are provided at three positions with intervals in the rotation direction (circumferential direction of virtual circle VC) of the pack side shutter 103. When the toner pack 100 is attached to the attachment portion 106, the radial direction positioning portions 103*f* of the pack side shutter 103 contact the inner circumferential surface 109*h* of the apparatus side shutter 109 to position the toner pack 100 in the radial direction r.

The nozzle 102 in the present exemplary embodiment is a component including a toner path 102*b* through which toner passes, and the discharge port 102*a* for discharging toner through the nozzle 102. The cross-sectional area of the nozzle 102 through which the toner passes may be decreasing, increasing, or uniform toward the discharge port 102*a*. The cross-sectional area and the length of the path of the nozzle 102 are not specifically limited, because they are appropriately changed depending on a toner discharge property. In addition, the discharge port 102*a* of the nozzle 102 may not be the opening at the most downstream through which toner is discharged from the toner pack 100. The toner discharged through the discharge port 102*a* of the nozzle 102 may be discharged outside the toner pack 100 after passing through a path configured of a member different from the nozzle 102.

In the present exemplary embodiment, the nozzle 102 is made of polypropylene, but may also be made of another material, such as acrylonitrile butadiene styrene (ABS) and polystyrene.

The pack side shutter 103 may be a rotational member including the driven force transmission portion 103*e* to constantly expose the discharge port 102*a* of the nozzle 102 regardless of the rotation position thereof. In this case, the discharge port 102*a* of the nozzle 102 may be configured in such a manner that the discharge port 102*a* is closed by a seal when the toner pack 100 is not attached to the attachment portion 106, and the seal is removed by an attaching operation of the toner pack 100 to the attachment portion 106 or removed after the toner pack 100 is attached to the attachment portion 106. The toner pack 100 without the pack side shutter 103 provided may also be used.

Figures 1A, 1B, 1C:
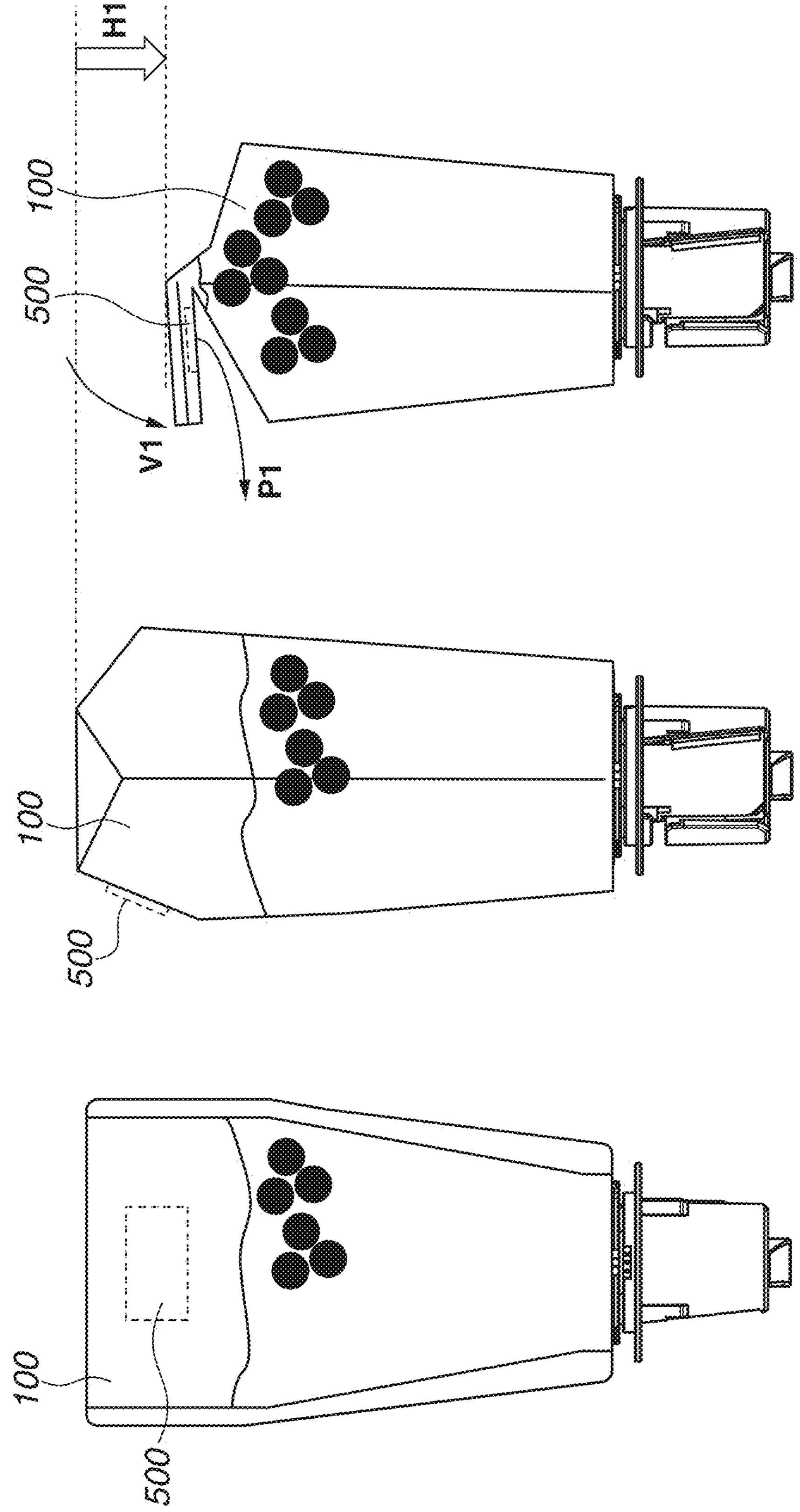
FIGS. 1A, 1B, and 1C are cross-section views illustrating an attachment portion and a toner pack at a toner replenishment time.
Figure 16A:
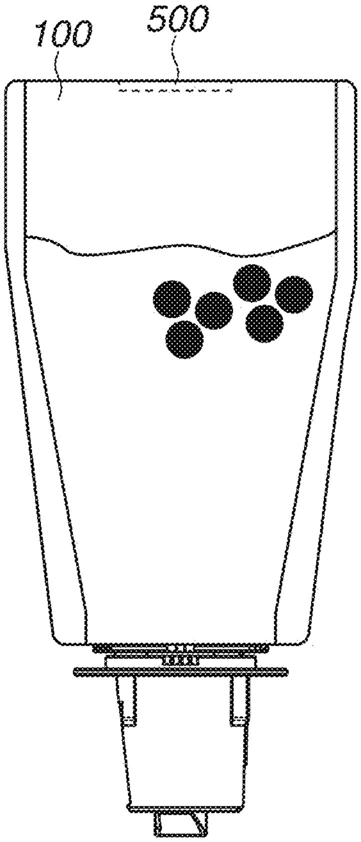
FIGS. 16A and 16B are respectively a front view and a side view illustrating a position of a filter of the toner pack.
Figure 16B:
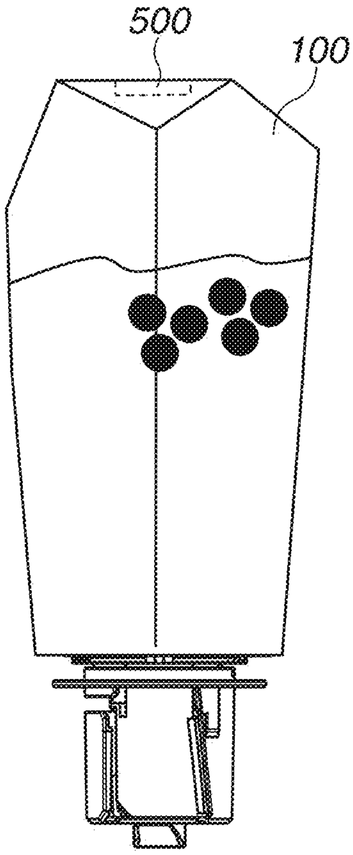

As illustrated in FIG. 1A, the toner pack 100 is provided with a sheet-shaped filter 500 (filter member). In FIG. 1A, the filter 500 is attached to the front surface of the toner pack 100, but the arrangement of the filter 500 is not limited thereto, and the filters 500 may be arranged on both sides of the toner pack 100. As illustrated in FIGS. 16A and 16B, the filter 500 may also be arranged on a top surface that is farthest from the discharge port 102*a* provided at an end of the toner pack 100. In other words, the top surface is an upper surface in a state where the toner pack 100 is attached to the image forming apparatus 1, and is the top surface of the toner pack 100.

The filter 500 may also be arranged on a front side or a back side of the toner pack 100.

In other words, the filter 500 may be arranged by attaching from the inner side of the toner pack 100, or from the outer side of the toner pack 100. The filter 500 is attached from the front surface or the back surface so as to cover the hole provided in advance in the toner pack 100. If there is a concern that toner may be caught around the filter 500 or the like, it may be preferable to attach the filter 500 from the outer side of the toner pack 100.

Hereinbelow, a configuration in which the filter 500 is arranged on one side surface of the toner pack 100 will be described.

The material of the filter 500 may preferably be, for example, polyester non-woven fabric and paper. These materials have a ventilation rate for preventing toner from passing therethrough while allowing air to pass therethrough. However, the material of the filter 500 is not limited to this configuration. The filter 500 may be provided with a resin frame.

Examples of a connection (joint) method for attaching and connecting (joining) the filter 500 to the toner pack 100 include a connection method by adhesive bonding and thermal welding.

For example, as a connection method by the thermal welding, the surface layer of the toner pack 100 is heated and melted, and then the surface layer of the filter 500 is placed. Thereafter, the melted surface layer of the toner pack 100 is solidified to fix the filter 500 on the surface layer of the toner pack 100.

It is also preferable to laminate a polypropylene (PP) base seal layer or a polyethylene (PE) base seal layer on a joint surface of the filter 500 to the toner pack 100 in advance. The joint surface is provided on one of the surfaces of a sheet-shaped filter. At a time of production, the surface layer of the toner pack 100 is heated and melted, and the seal layer is also heated and melted. The toner pack 100 and the filter 500 are attached in a state where the surface layer of the toner pack 100 and the seal layer of the filter 500 are melted, and the melted portions are cooled and solidified to fix the filter 500 onto the surface layer of the toner pack 100.

In a case where the air ventilation rate decreases from laminating the seal layer on the whole surface of the filter 500, the seal layer may be laminated on only four corners of the filter 500, not the whole surface thereof.

In a case where the container 101 is made of polypropylene for the toner pack 100, it is preferable to configure the container 101 by laminating two types of polypropylene. The first type is oriented polypropylene (OPP), and the second type is cast polypropylene (CPP). OPP is more suitable for printing thereon than CPP because OPP is higher in orientation property and glossiness property than CPP. CPP is also more suitable for thermal welding than OPP, because CPP is non-oriented and softer. Thus, it is desirable that the front side of the container 101 is made of OPP, and the back side thereof is made of CPP. This is because printing is performed on the front surface of the container 101, and the back surface is joined by thermal welding.

In this case, it is suitable for the thermal welding to attach the filter 500 from its back surface side made of CPP. In this case, the surface of CPP of the back surface and the laminated seal layer of the filter may be melted by heat and attached.

Now, an amount of toner filled in the conventional toner pack 100 will be described. Conventionally, the toner pack 100 is produced while controlling the mixture ratio between toner and air to be able to discharge the toner smoothly. This is because the flowability of toner deteriorates when the amount of toner is too much for the inner volume of the toner pack 100 and the toner becomes a consolidation state. In a case where a user attempts to discharge toner by squashing the toner pack 100 in this state, the toner cannot be discharged smoothly. In other words, with the conventional configuration, there is a limit to reduce the size of the toner pack 100 filled with a specified toner amount. In contrast, with the configuration according to the present exemplary embodiment as illustrated in FIG. 1C, it is possible to perform consolidation filling of toner in the toner pack before the shipment, and to transport the toner pack in a reduced size, which will be described in detail below. The toner pack 100 can take air in the toner pack 100 via the filter 500 when the toner is replenished, and thus the toner consolidation state can be resolved.

<Filling Toner into Toner Pack and Shipping>

Now, consider a process of filling toner in the toner pack 100. When the toner pack 100 is left in a state illustrated in FIGS. 1A and 1B after filling toner therein, the toner settles out toward the bottom part, which is the nozzle 102 side, and a layer consisting of only air is generated on the upper side of the toner pack 100.

In the conventional configuration, the toner pack 100 is shipped in its own size. On the other hand, in the configuration according to the present exemplary embodiment, the toner pack 100 is provided with the filter 500, and thus the air in the toner pack 100 can be discharged.

FIG. 1C illustrates a state where the upper part of the toner pack 100 is folded from the state illustrated in FIG. 1B, and the air in the toner pack 100 is discharged outside. More specifically, the top part of the toner pack 100 is folded in a direction indicated by an arrow V1. The air in the toner pack 100 is discharged outside as indicated by an arrow P1, so that the toner pack 100 can be shrunk into a small size. Compared with the state illustrated in FIG. 1B, the toner pack 100 can be made smaller by a height H1 in the state illustrated in FIG. 1C. In other words, the consolidation filling of the toner in the toner pack 100 can be performed, and thus the toner pack 100 can be packed small, and transported in a small size at the time of shipment. In addition, the toner pack 100 may be pressed to discharge the air through the filter 500 when the toner pack 100 is packed in a box.

<Discharging Toner from Toner Pack>

Figure 17A:
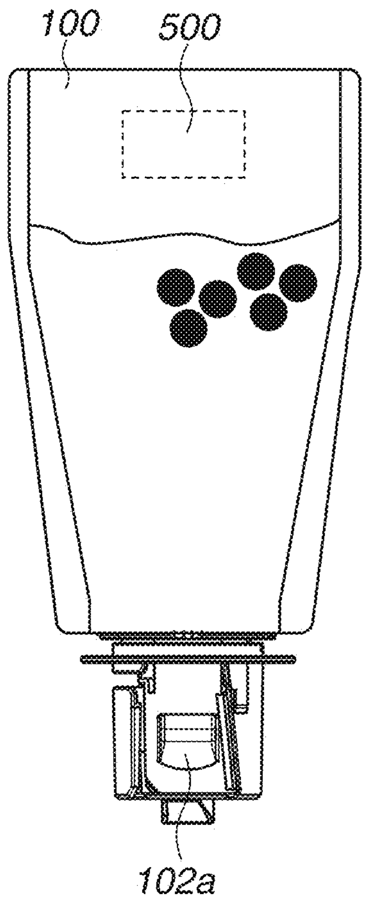
FIGS. 17A and 17B are cross-section views illustrating the attachment portion and the toner pack at the toner replenishment time.
Figure 17B:
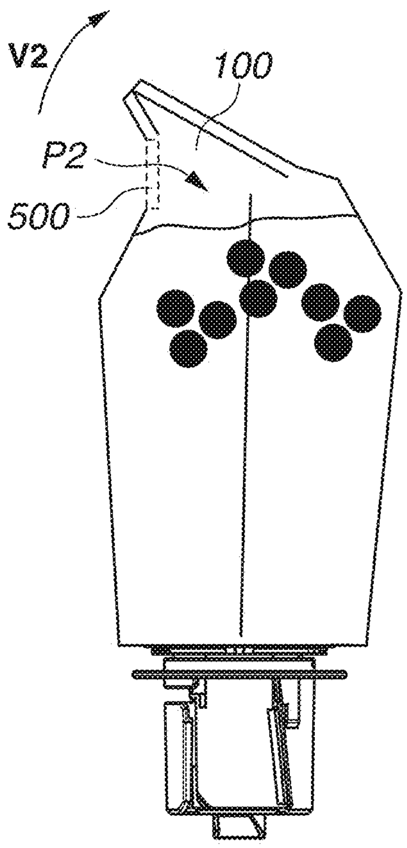

Before attaching the toner pack 100 to the image forming apparatus 1, air is newly taken into the toner pack 100 through the filter 500 by a user deforming the toner pack 100 to expand the size thereof as illustrated in FIGS. 17A and 17B. More specifically, the top part of the toner pack 100 is moved in an arrow V2 direction to take air into the toner pack 100 as indicated by an arrow P2, and the size of the toner pack 100 increases.

Figure 18:
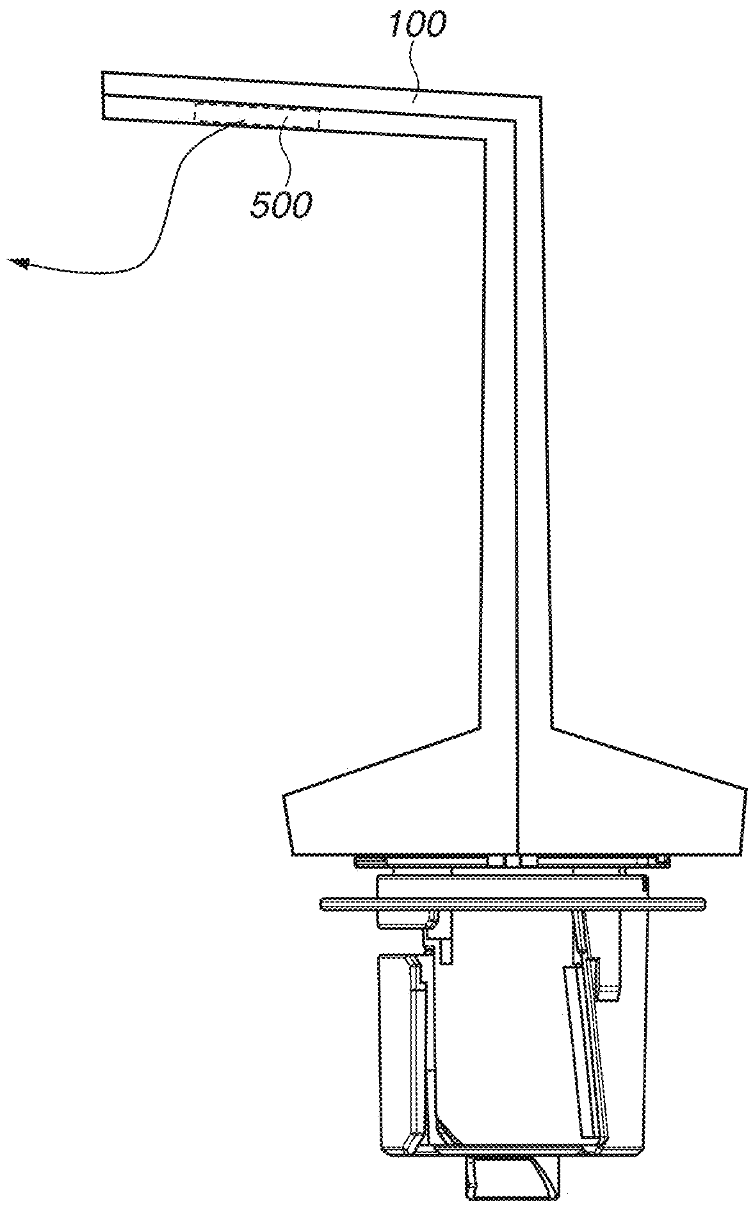
FIG. 18 is a cross-section view illustrating the attachment portion and the toner pack at the toner replenishment time.

Even when a user receives the toner pack 100 in which the toner is in an agglutinated state, the user can make the toner be fluid by shaking the toner pack 100 to mix the toner and the air in the toner pack 100. As a result, the toner can be smoothly discharged from the toner pack 100. As illustrated in FIG. 18, after the user smoothly discharges the toner from the toner pack 100, the toner pack 100 can be shrunk into a small size.

As illustrated in FIG. 17A, the filter 500 is arranged at a position far from the discharge port 102*a* of the toner pack 100. In this case, toner is not present near the filter 500 when air is taken into the toner pack 100, and thus the air can easily be taken into the toner pack 100 without being disturbed by the toner.

<Replenishment Operation>

Next, an operation of attaching the toner pack 100 to replenish toner will be described with reference to FIGS. 19A, 19B, and 20.

Figure 19B:
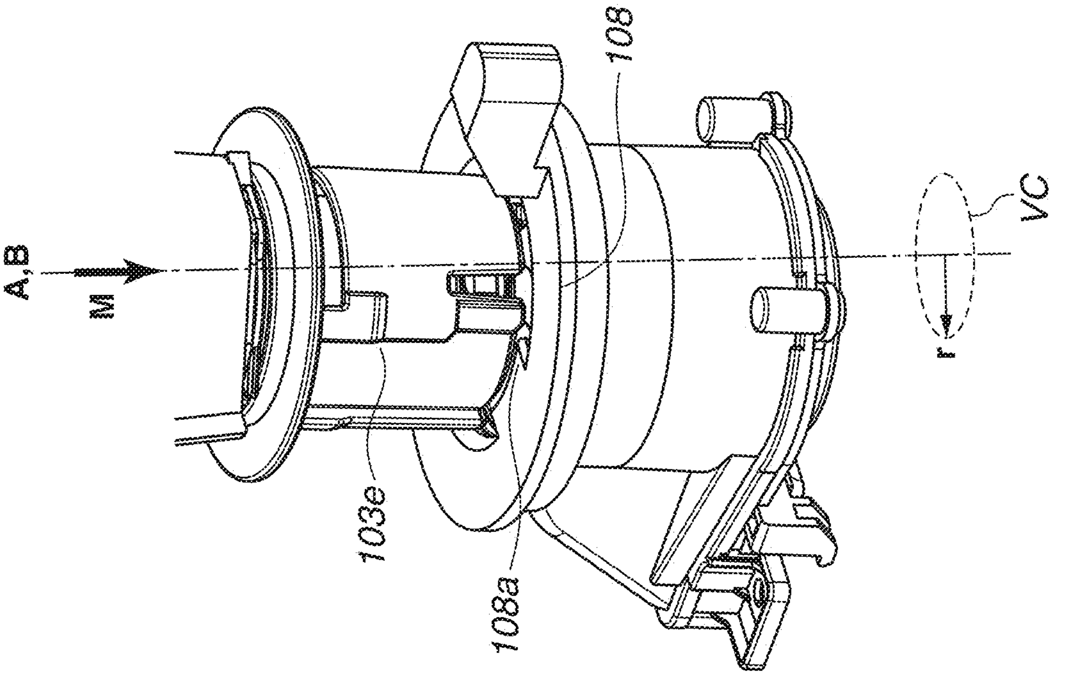
FIGS. 19A and 19B are perspective views illustrating the attachment portion and the toner pack in a process of being attached.
Figure 19A:
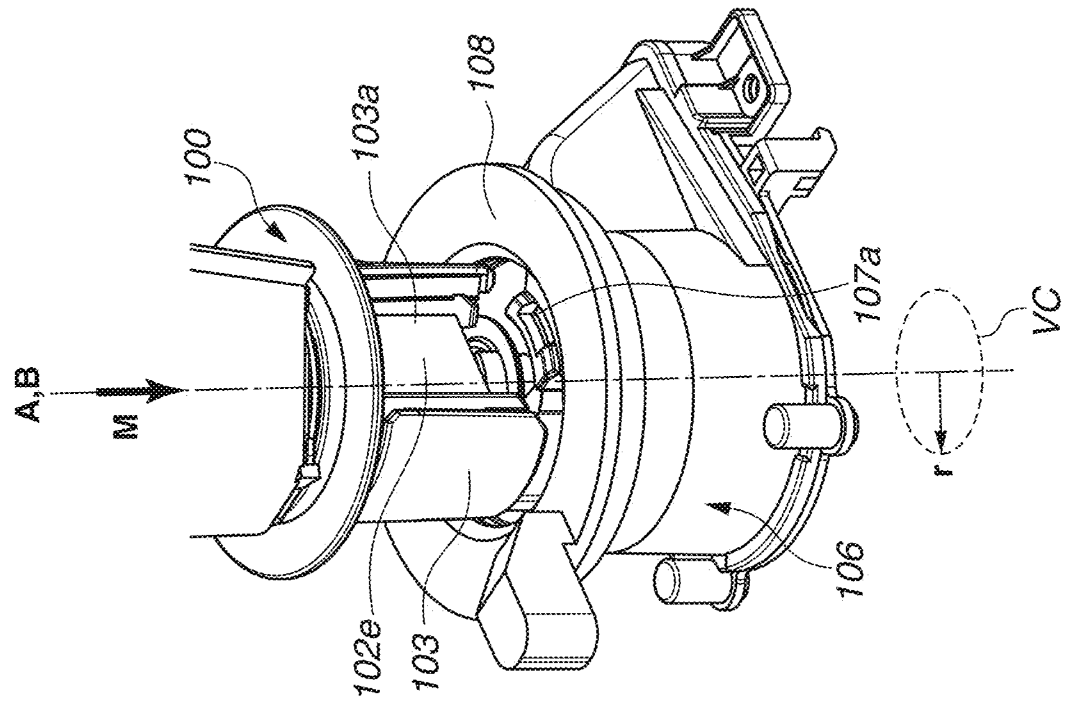
Figure 21B:
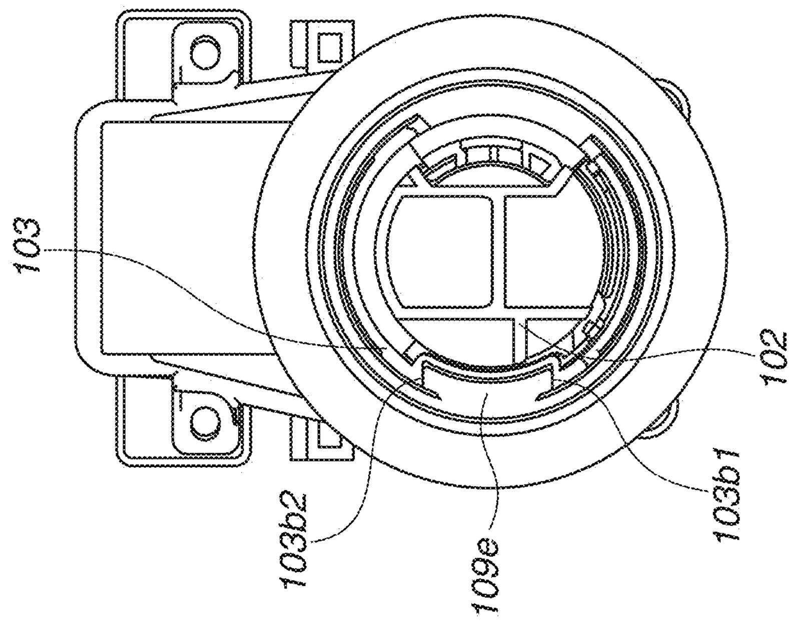
FIGS. 21A and 21B are cross-section views illustrating the attachment portion and the toner pack at the attaching-completed time.
Figure 21A:
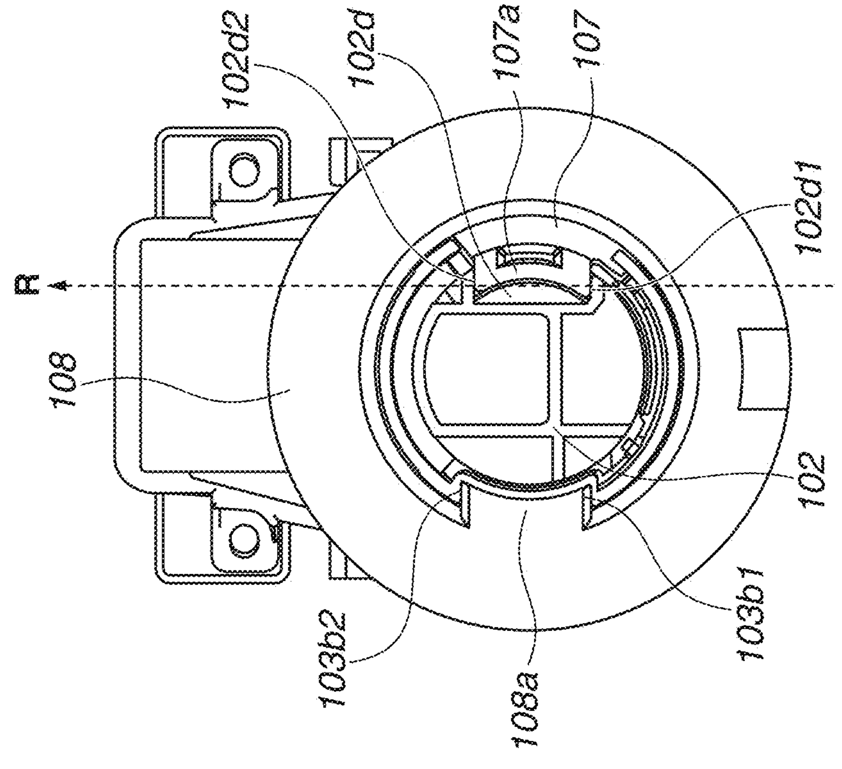
Figure 22A:
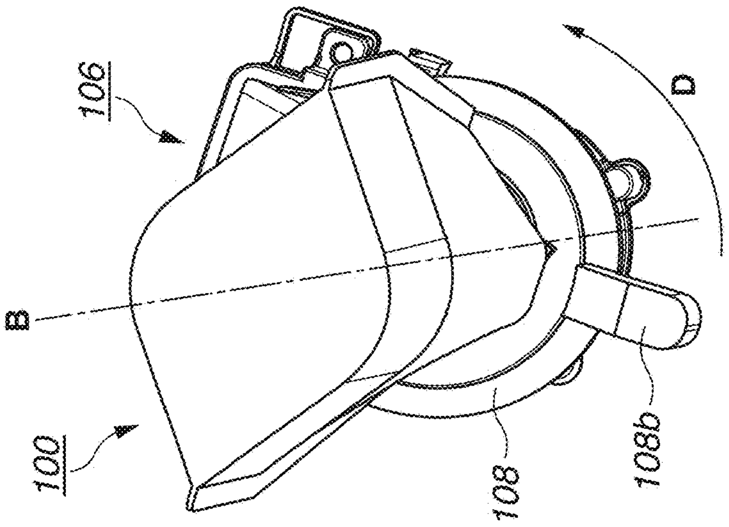
FIGS. 22A and 22B are perspective views respectively illustrating the toner pack attached to the attachment portion when an operation lever is located at a closed position and an open position viewed from above.
Figure 22B:
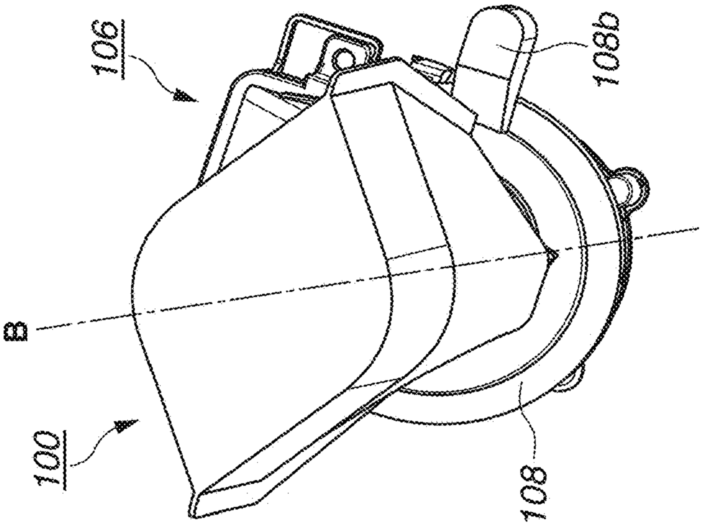
Figure 22C:
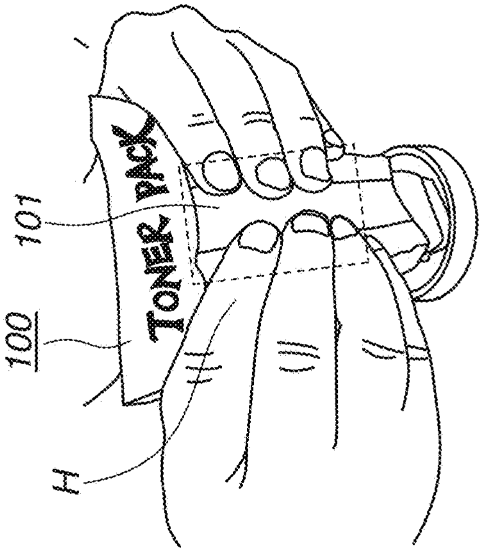
FIG. 22C is a diagram illustrating a state when a user replenishes toner.

FIG. 19A is a perspective view illustrating the toner pack 100 and the attachment portion 106 in the middle of the toner pack 100 being attached to the attachment portion 106. FIG. 19B is a perspective view illustrating the toner pack 100 and the attachment portion 106 from a viewpoint different from that in FIG. 19A. FIG. 20 is a cross-section view illustrating a cross-section parallel to the rotation axis line A (rotation axis line B) in an attachment-completed state where the toner pack 100 has been further moved to the attaching direction from the state in FIGS. 19A and 19B. FIG. 21A is a cross-section view illustrating a cross-section taken along an X1-X1 line in FIG. 20. FIG. 21B is a cross-section view illustrating a cross-section taken along an X2-X2 line in FIG. 20. FIG. 22A is a perspective view illustrating the toner pack 100 when the operation lever 108 is at an open position, when viewed from above. FIG. 22B is a perspective view illustrating a state where the pack side shutter 103 and the apparatus side shutter 109 become an open state from a closed state by operating the operation lever 108 from the state in FIG. 22A. FIG. 22C is a diagram schematically illustrating a state when a user replenishes toner. FIG. 1A is a cross-section view taken along an X3-X3 line in FIG. 20 illustrating a state after the operation lever 108 is operated from the state in FIG. 20. FIGS. 1B and 1C are cross-section views illustrating a state where the user squashes the toner pack 100 from the state in FIG. 22A when the user replenishes the toner.

As illustrated in FIGS. 19A and 19B, the toner pack 100 in a state where the pack side shutter 103 is at a closed position is attached by moving the toner pack 100 in the attaching direction M with respect to the attachment portion 106 in a state where the apparatus side shutter 109 is at a closed position. At this time, the position of the recessed portion 102*e* of the nozzle 102 (opening 103*a* of pack side shutter 103), and the position of the positioning member 107*a* of the first frame member 107 are aligned in the rotation direction of the pack side shutter 103 when viewed in the attaching direction M. At the same time, the position of the driven force transmission portion 103*e* of the pack side shutter 103, and the position of the drive force transmission portion 108*a* of the operation lever 108 are also aligned in the rotation direction of the pack side shutter 103.

Figure 20:
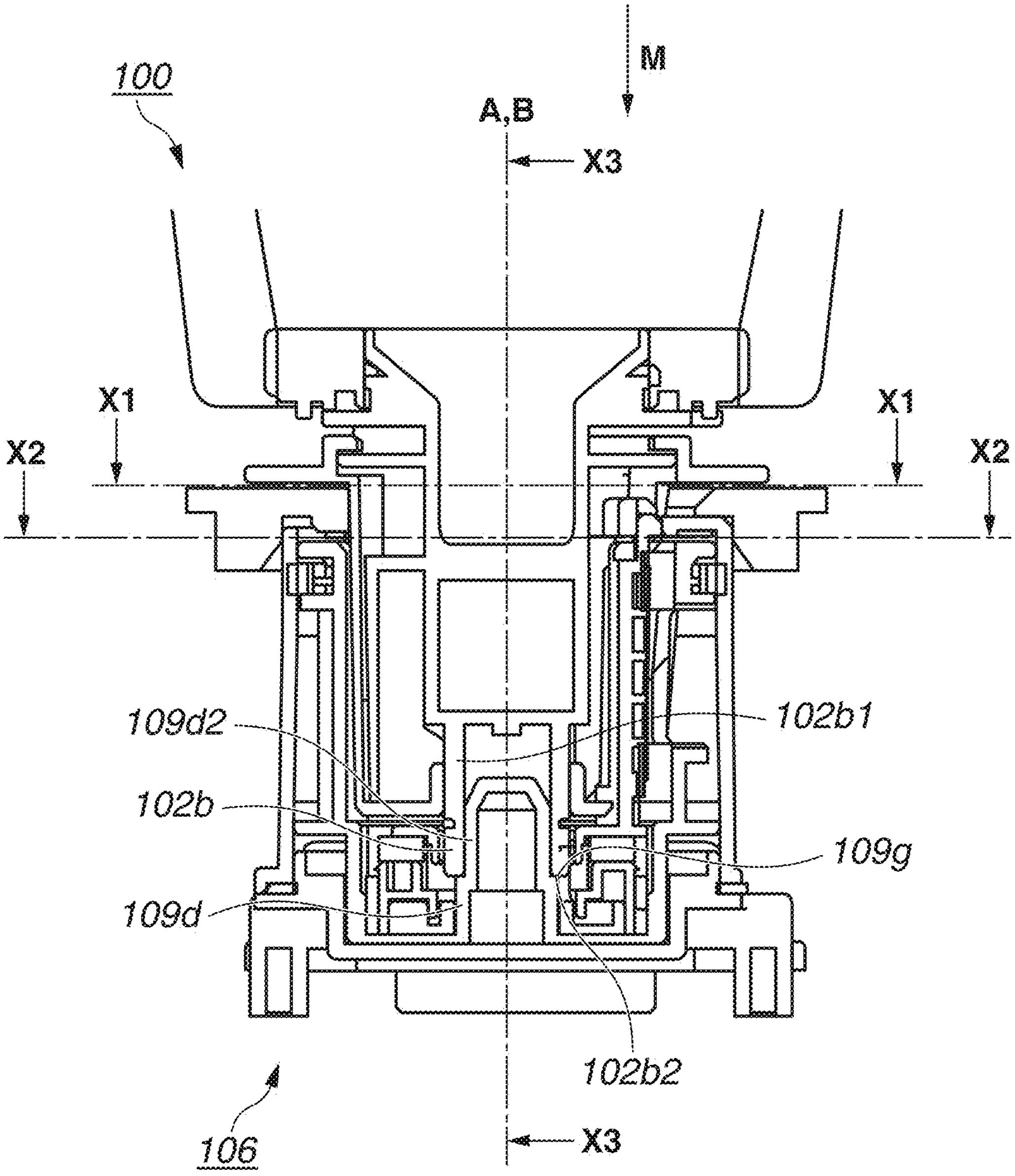
FIG. 20 is a cross-section view illustrating the attachment portion and the toner pack at an attaching-completed time.

After aligning the above described positions, the toner pack 100 reaches the attaching-completed position illustrated in FIG. 20 as the toner pack 100 is moved in the attaching direction M to be attached to the attachment portion 106. As illustrated in FIG. 20, a small diameter portion 109*d*2 of the center boss 109*d* of the apparatus side shutter 109 is fit to (engaged with) an inner circumferential surface 102*b*1 of the protruding portion (toner path 102*b*) of the nozzle 102. In this way, the position of the nozzle 102 at a lower portion (downstream side in attaching direction M) thereof is determined relative to the apparatus side shutter 109 in the radial direction. The three radial direction positioning portions 103*f* of the pack side shutter 103 (see FIGS. 13A and 13B) are in contact with the inner circumferential surface 109*h* of the apparatus side shutter 109 (see FIGS. 8A and 8B). In this way, the positions of the nozzle 102 and the pack side shutter 103 (toner pack 100) on the upstream side in the attaching direction M in the radial direction are determined. On the other hand, protruding portion end surfaces 102*b*2 of the toner path 102*b* of the nozzle 102 are in contact with the pack contact surface 109*g* of the apparatus side shutter 109. In this way, the position of the nozzle 102 (toner pack 100) is determined with respect to the attachment portion 106 in the rotation axis line A direction (attaching direction M). As illustrated in FIG. 21A, the positioning member 107*a* of the first frame member 107 engages with the positioned portion 102*d* of the nozzle 102 having the surface 102*d*1 and the surface 102*d*2. As a result, the position of the nozzle 102 is determined relative to the first frame member 107 (base frame member 2) in an arrow R direction of the surface 102*d*1 and the surface 102*d*2. However, the inner circumferential surface 102*b*1 of the toner path 102*b* may not be configured to fit with the center boss 109*d*, as long as they are configured not to interfere with each other. As illustrated in FIG. 21A, the drive force transmission portion 108*a* (lever protruding portion) of the operation lever 108 engages with the driven force transmission portion 103*e* (rotational member recessed portion, see FIG. 14) of the pack side shutter 103. As illustrated in FIG. 21B, the driven force transmission portion 103*e* (rotational member recessed portion) of the pack side shutter 103 engages with the driven force transmission portion 109*e* (shutter protruding portion) of the apparatus side shutter 109. In this way, the rotation axis line A of the pack side shutter 103 and the rotation axis line B of the apparatus side shutter 109 become substantially coaxial. The operation lever 108, the pack side shutter 103, and the apparatus side shutter 109 can almost integrally move in the rotation around the rotation axis line A (rotation axis line B) relative to the first frame member 107 (base frame member 2) and the nozzle 102. More specifically, when the operation lever 108 is rotated, the drive force transmission portion 108*a* of the operation lever 108 presses the surface 103*b*1 or 103*b*2 of the pack side shutter 103 to rotate the pack side shutter 103.

Thereafter, the surface 103*b*1 or the surface 103*b*2 of the pack side shutter 103 presses the driven force transmission portion 109*e* of the apparatus side shutter 109 to rotate the apparatus side shutter 109.

As illustrated in FIGS. 22A and 22B, when the operation portion 108*b* of the operation lever 108 is rotated in a first direction D (rotation direction D) after the completion of attaching the toner pack 100 to the attachment portion 106, the apparatus side shutter 109 rotates from the closed position to the open position, and the pack side shutter 103 rotates from the closed position to the open position. At this time, the user presses a part of an area H of the toner pack 100 to replenish toner as illustrated in FIG. 22C.

According to the present exemplary embodiment, it is possible to discharge unnecessary air in the toner pack 100 after the toner is filled, to perform consolidation filling of the toner in the toner pack 100, and as a result, it is possible to improve a transportation efficiency at the time of distribution and transportation. This is because the occupying volume per one toner pack 100 becomes small since the toner pack 100 is transported in a state where the toner pack 100 is squashed and the air in the toner pack is discharged outside.

After the air is discharged, the toner in the toner pack becomes dense, but when the user replenishes the toner, the user can smooth out the toner pack 100 by hand to easily allow air to enter the toner pack 100 via the filter 500. The user can then clear the consolidation state of the toner and improve the fluidity of the toner by shaking the toner pack 100. In this way, the user can smoothly discharge the toner.

Even if the toner is unevenly distributed in the toner pack and solidified due to its own weight, the air enters the toner pack 100 via the filter 500 as described above, and the user can loosen the toner in the toner pack 100 by shaking the toner pack 100.

Figure 27:
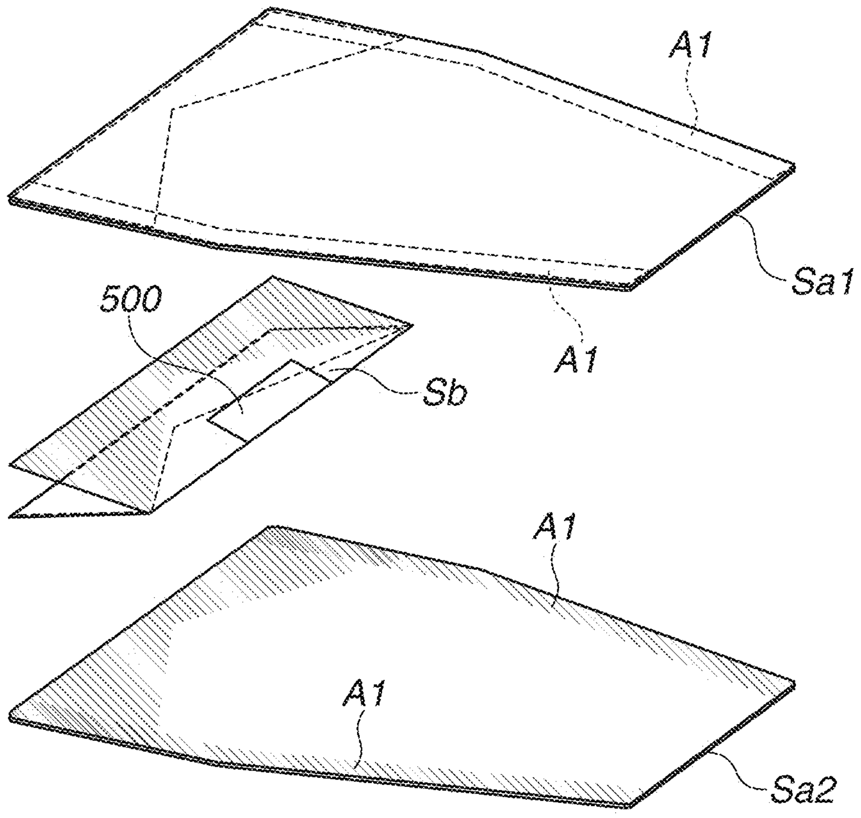
FIG. 27 is a schematic diagram illustrating a toner pack production method.

FIG. 27 is a schematic diagram illustrating a toner pack production method. A row sheet Sb, which will become a bottom portion of the pouch, is sandwiched between two row sheets Sa1 and Sa2, which will become side portions of the pouch, in a state where the row sheet Sb is folded in two. In this state, sealing portions A1 are formed by thermally welding the side edges of the row sheets Sa1 and Sa2. The bag-shaped pouch (cylindrical shape with a bottom) is formed by also thermally welding the peripheries of the row sheets Sa1 and Sb and the row sheets Sa2 and Sb to form sealing portions in a similar manner. The bottom portion configured of the row sheet Sb forms the gusset portion. Similarly to the row sheet Sb, the gusset portions may be formed at side portions other than the bottom portion, by disposing other row sheets between the sealing portions A1 on both sides. As illustrated in FIG. 27, the filter 500 may be provided on the row sheet Sb that forms the gusset portion.

FIG. 28A to 28E illustrates the toner pack produced by the method described above in FIG. 27.

Figure 28A:
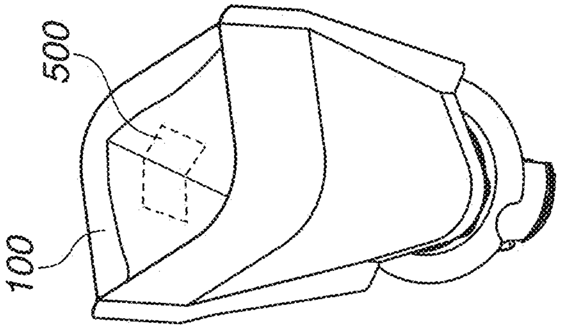
FIGS. 28A and 28B are respectively a perspective view and a front view illustrating a modification example of a position of the toner pack filter.
Figure 28B:
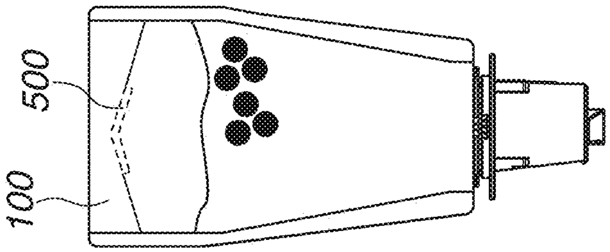
Figure 28C:
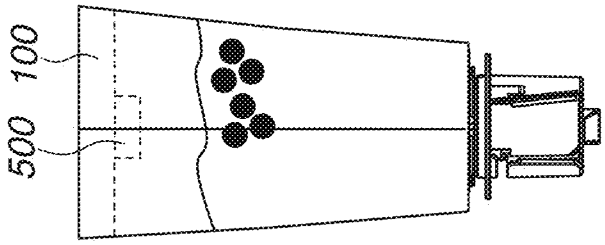
FIGS. 28C, 28D, and 28E are respectively a front view, a perspective view, and a side view illustrating an example of a position of the toner pack filter.
Figure 28D:
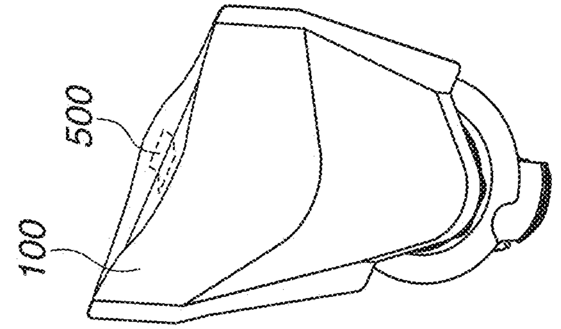

FIG. 28D is a perspective view illustrating the toner pack 100. The filter 500 is arranged on the above-described gusset portion. FIG. 28C is a front view illustrating the toner pack 100. The position of the filter 500 is illustrated in this front view. Since the position of the filter 500 is arranged at a part not viewable in the front view, the position is illustrated with broken lines.

Figure 28E:
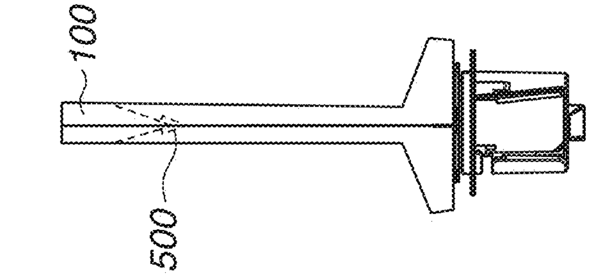

FIG. 28E is a side view illustrating the toner pack 100 corresponding to the configuration in FIG. 28D. FIG. 28E illustrates the toner pack 100 after the toner stored in the toner pack 100 is supplied to the image forming apparatus 1. When the toner pack 100 is empty, the gusset portion is folded.

FIG. 28A is a perspective view illustrating a modification example of the toner pack 100 illustrated in FIG. 28D. Similarly to the above-described example, the filter 500 is arranged on the gusset portion. Similarly to FIG. 28D, FIG. 28A is the perspective view illustrating the toner pack 100. Similarly to FIG. 28D, the filter 500 is arranged on the gusset portion, but the folding direction of the gusset portion is different from that in FIG. 28D. FIG. 28B illustrates the same configuration described in FIG. 28A. FIG. 28B is a front view illustrating the toner pack 100 corresponding to the toner pack 100 in FIG. 28A. FIG. 28B also illustrates the position of the filter 500. Since the position of the filter 500 is arranged at a part not viewed in the front view, the position is illustrated with broken lines.

Figure 29:
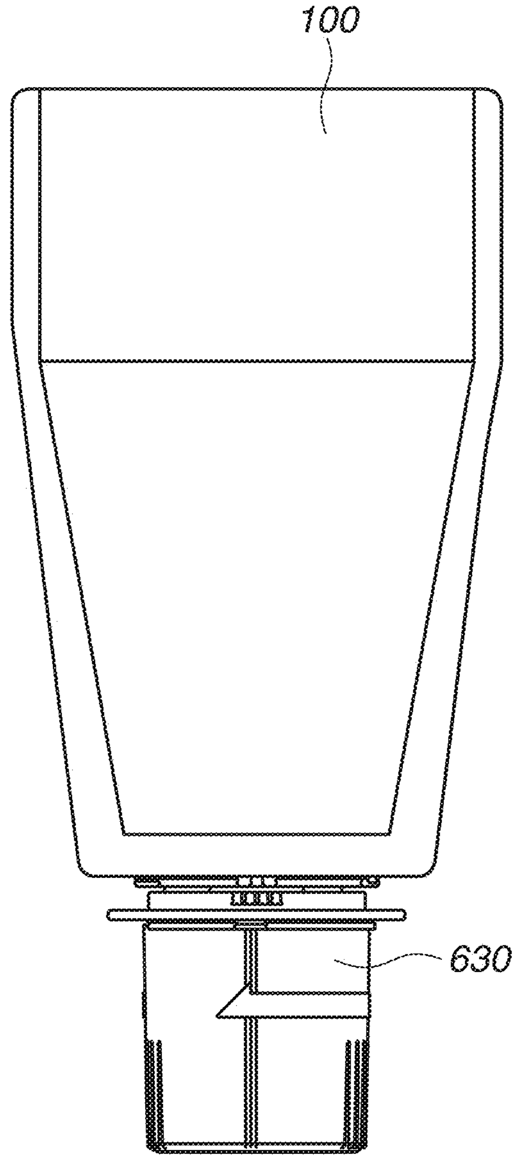
FIG. 29 is a front view illustrating a toner pack provided with a cap.

FIG. 29 illustrates a front view of the toner pack 100. The toner pack 100 in FIG. 29 is produced by the production method illustrated in FIG. 27 described above. Further, the position of the filter 500 cannot be viewed in the front view because the filter 500 is arranged on the gusset portion as illustrated in FIG. 28. In FIG. 29, the toner pack 100 is provided with a cap 630 to cover the nozzle 102 (not illustrated) to be attachable to and detachable from the nozzle 102.

Toner is filled in the toner pack 100, but when air is discharged through the filter 500 and the toner pack 100 is squashed, the volume of the toner pack 100 decreases. In this way, the volume of the toner pack 100 per one toner pack decreases, and thus the transportation efficiency thereof increases at the time of distribution and transportation in a cardboard or the like.

On the other hand, in the case where the gusset portion is provided as illustrated in FIG. 28, it is also possible to place the toner pack 100 in a standing state with its gusset portion facing down. When the toner pack 100 is displayed on a store shelf after being taken out from a cardboard box, it is possible to place the toner pack 100 with its gusset portion facing down.

However, if the air is discharged and the gusset portion is squashed to increase the efficiency of distribution and transportation, it may be difficult for a salesperson of a store person to display the toner pack 100 in a standing state with the gusset portion facing down in displaying the toner pack 100 on a store shelf. It is because the gusset portion is not expanded, and it is difficult for the salesperson to place the toner pack 100 as it is in the standing state.

Thus, in the case where the cap 630 for covering the nozzle 102 described above illustrated in FIG. 29 is provided, the salesperson or the like can place the toner pack 100 with the cap 630 facing down even in the state where the gusset portion is squashed, which is preferable. This is because the cap 630 is designed to have a surface suitable for placing the toner pack 100 in a standing state. The surface for placing the toner pack 100 in a standing state is provided in a direction intersecting with the direction in which the container 101 and the nozzle 102 are aligned. In this way, the toner pack 100 is configured to be able to stand without support when the surface of the cap 630 is brought into contact with a horizontal surface.

Figure 30C:
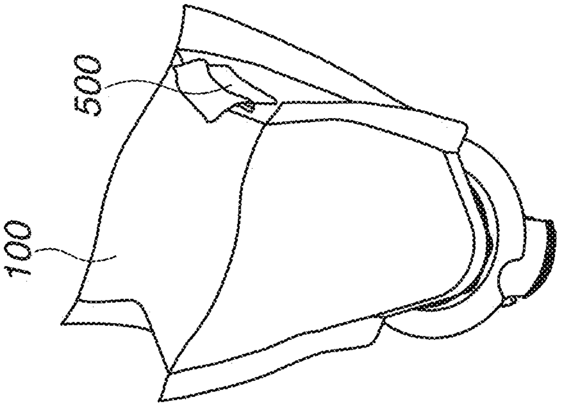
FIGS. 30A, 30B, and 30C are perspective views illustrating a toner pack with gusset portions on its both sides.
Figure 30B:
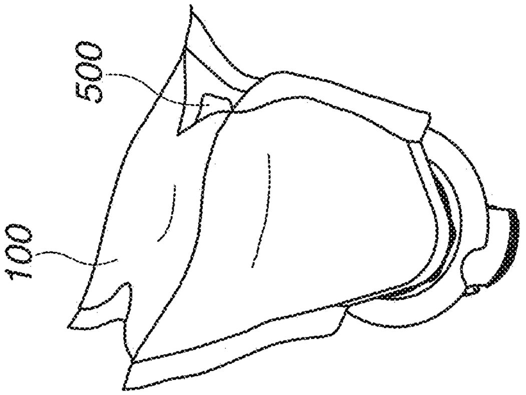
Figure 30A:
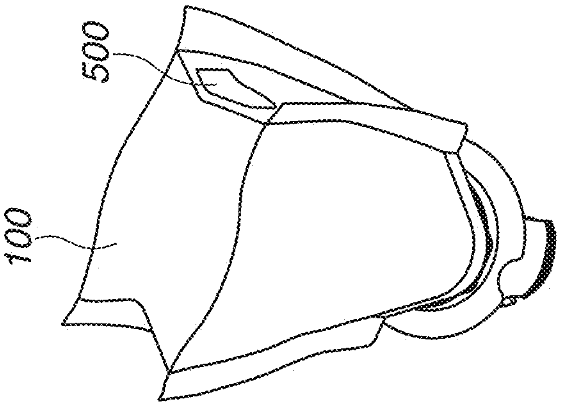

FIGS. 30A, 30B, and 30C are perspective views illustrating the toner pack 100, and a gusset portion is provided on a side of the toner pack 100. The filter 500 is at the gusset portion provided on the side. The filter 500 is provided at a position near the gusset portion on the top surface side opposite to the nozzle. This configuration is advantageous in that the filter does not spoil the appearance of the toner pack 100 because the filter 500 is arranged at a less noticeable position than a position on the front surface or the top surface of the toner pack 100 in a state where the toner pack 100 is attached to the image forming apparatus 1.

Figure 23A:
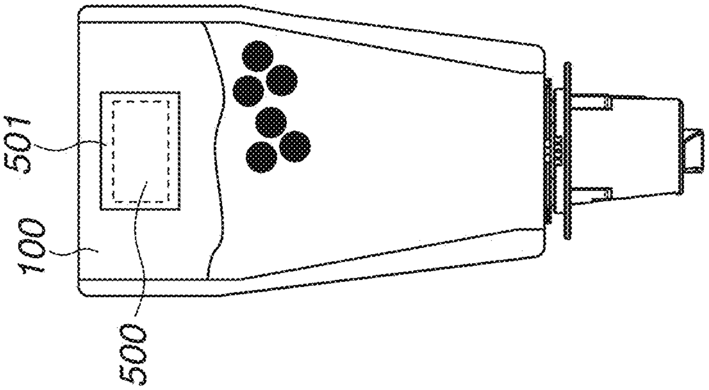
FIGS. 23A, 23B, 23C, and 23D are a front view and side views illustrating a configuration of a filter open/close seal.
Figure 23B:
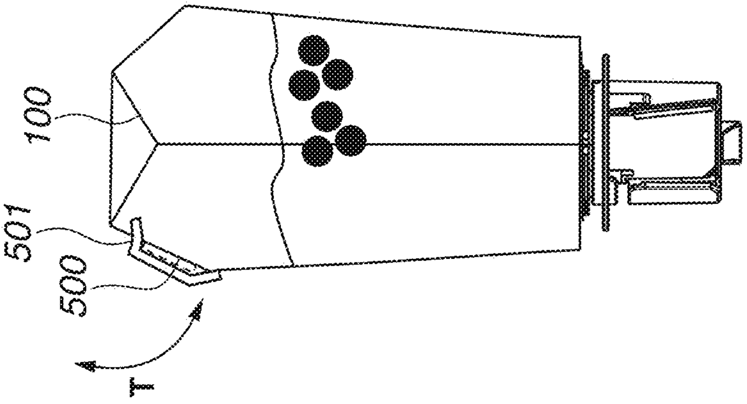
Figure 23C:
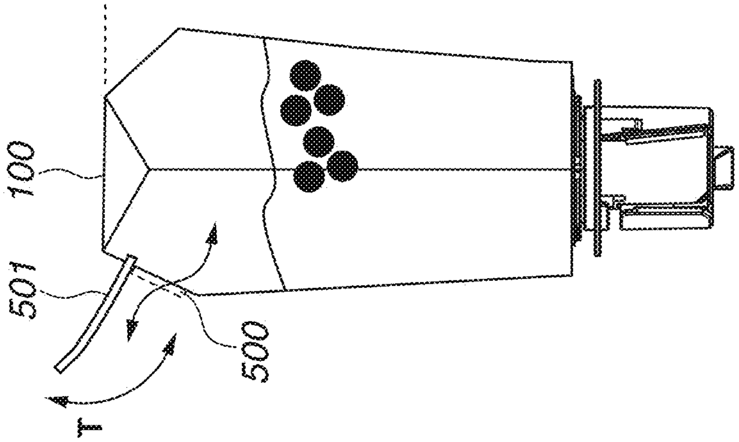

As illustrated in FIGS. 23A to 23D, a second exemplary embodiment is provided with a filter open/close seal 501 as a seal member for covering the filter 500, in addition to the configuration according to the first exemplary embodiment. The filter open/close seal 501 provided on the filter 500 is movable between a position covering the filter 500 (first position) illustrated in FIG. 23B, and a position exposing the filter 500 in a T direction (second position) as illustrated in FIG. 23C.

More specifically, examples of a connection method of connecting the filter open/close seal 501 to the toner pack 100 include a connection by adhesive bonding and heat welding. However, the connection method is not specifically limited similarly to the connection of the filter 500 to the toner pack 100 described above. Further, in FIGS. 23A to 23D, a part of the filter open/close seal 501 is connected to the toner pack 100 without being peeled. Further, an adhesive layer of, for example, paste is provided at least at positions contacting the toner pack 100 in other portions. With this configuration, the filter open/close seal 501 is movable between the position for covering the filter 500 and the position for exposing the filter 500. The filter open/close seal 501 is also configured to prevent the air in the toner pack 100 from passing through to the outside of the toner pack 100 at the position for covering the filter 500. The configuration of the filter open/close seal 501 is not limited thereto, and, for example, a configuration may be employed in which the part connected with the toner pack 100 without being peeled described above is not provided. More specifically, when the filter 500 is exposed, the filter open/close seal 501 may be completely separated from the toner pack 100, and, on the other hand, when the filter 500 is covered, the filter open/close seal 501 may reseal the filter 500 with respect to the toner pack 100 using the adhesive layer. The filter open/close seal 501 may also be configured to clip a part of the pouch.

Figure 24A:
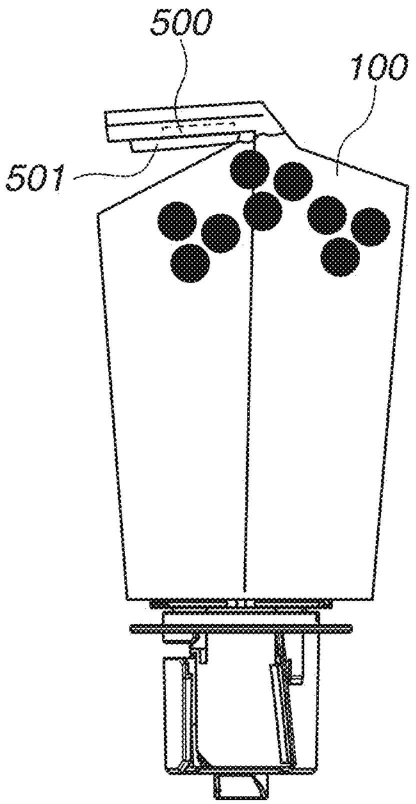
FIGS. 24A and 24B are side views illustrating an operation of opening the filter open/close seal.
Figure 24B:
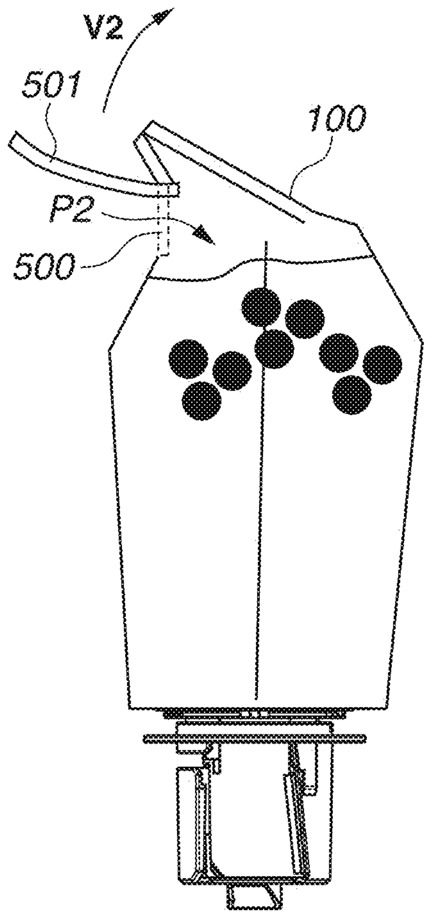
Figure 25A:
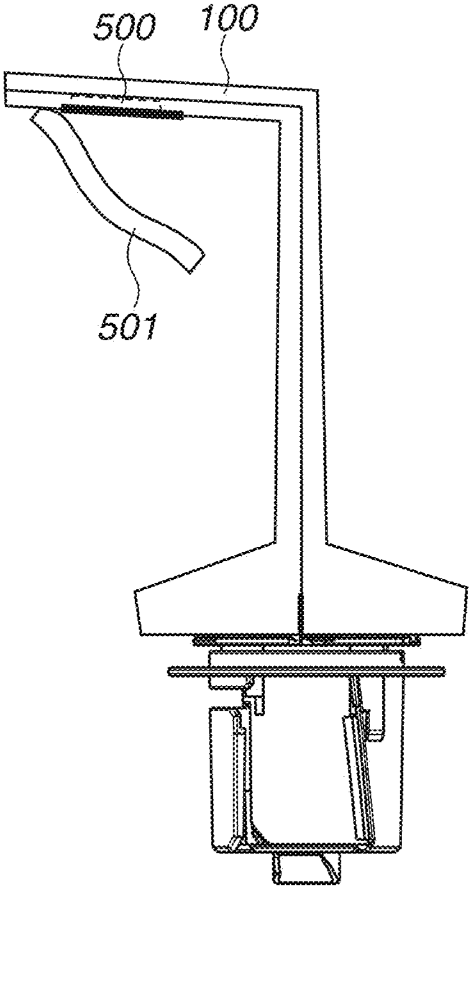
FIGS. 25A and 25B are side views illustrating a closing operation of the filter open/close seal.
Figure 25B:
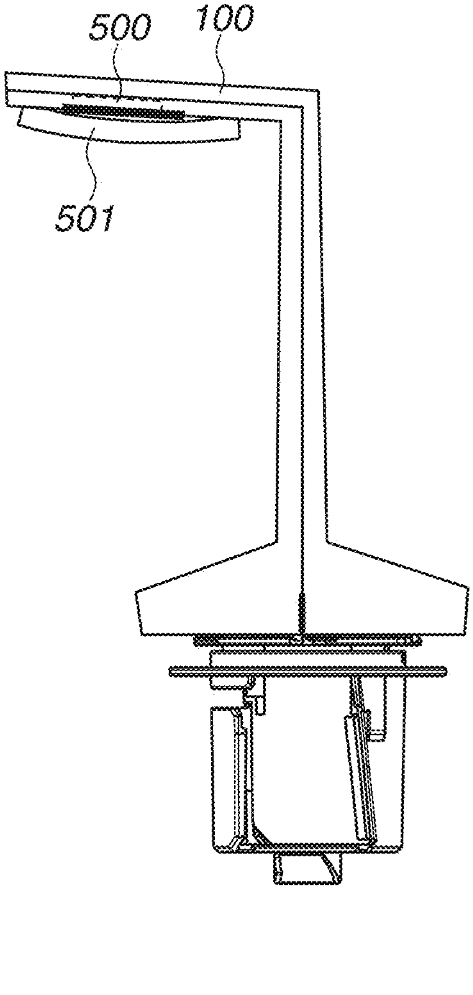
Figure 26:
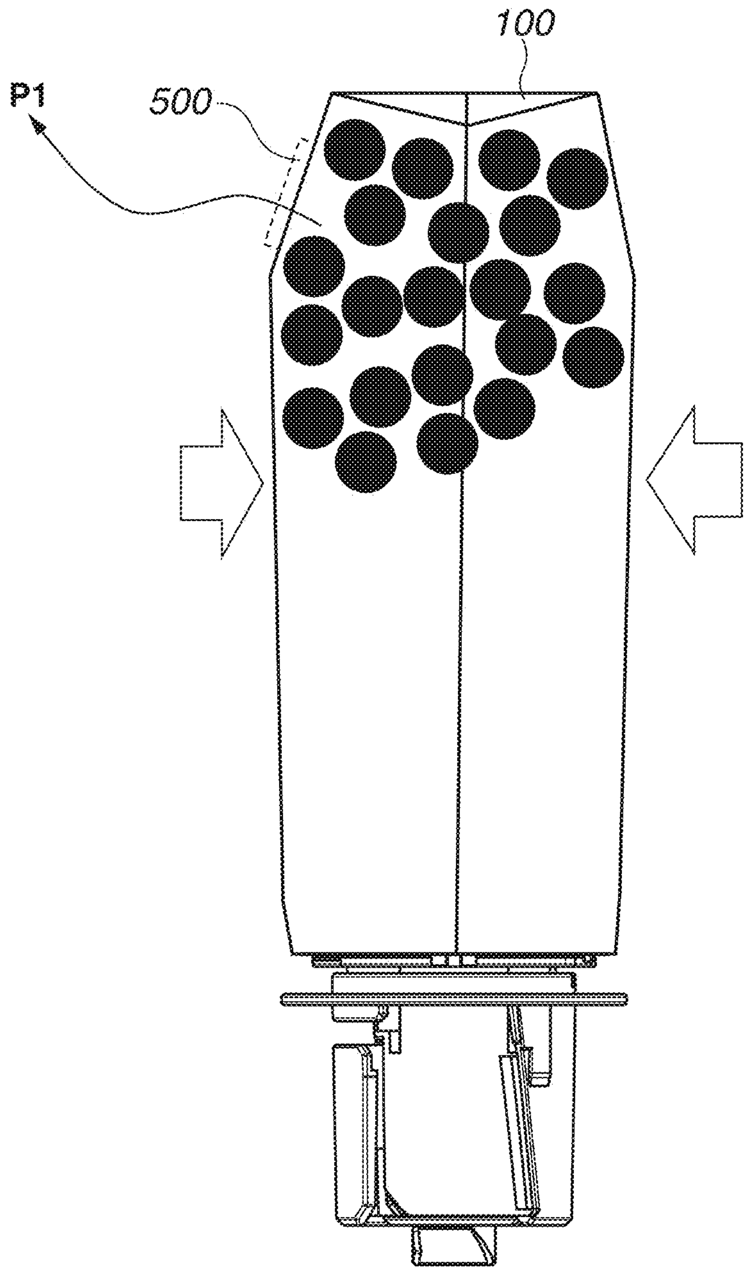
FIG. 26 is a side view of the toner pack illustrating an operation of squashing the toner pack.

As illustrated in FIG. 23C, when air is taken into the toner pack 100, the user moves, in the T direction, the filter open/close seal 501 to a position at which the filter 500 is exposed. More specifically, before attaching the toner pack 100 to the image forming apparatus 1, the user moves the filter open/close seal 501 in the arrow V2 direction to a position exposing the filter 500 as illustrated in FIGS. 24A and 24B. When the user deforms and expands the toner pack 100, new air comes into the toner pack 100 through the filter 500. More specifically, the top part of the toner pack 100 is moved in the arrow V2 direction to take air into the toner pack 100 as indicated by the arrow P2, and the size of the toner pack 100 increases. When the user discharges the toner in the toner pack 100, the filter open/close seal 501 is moved again to a position covering the filter 500 as illustrated in FIG. 23B, to prevent the air from discharging from the toner pack 100 through the filter 500. In this way, it is possible to increase the internal pressure in the toner pack 100 generated when the user squashes the toner pack 100, and to smoothly replenish the toner. As illustrated in FIG. 25A, when the user squashes the toner pack 100 and the toner is completely discharged, the filter 500 can be covered by the filter open/close seal 501 as illustrated in FIG. 25B. In this way, since air is not taken into the toner pack 100 again through the filter 500, the toner pack 100 can be kept small.

Figure 23D:
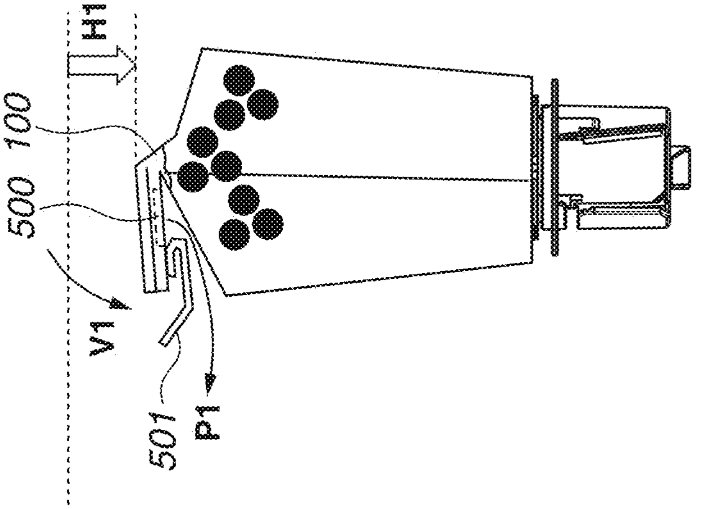

In the description given above, the toner pack 100 has the configuration in which the height H1 becomes smaller as illustrated in FIGS. 1C and 23D. However, the direction in which the volume of the toner pack 100 becomes smaller is not limited thereto. For example, the height H1 of the toner pack 100 may remain almost unchanged and may be shrunk to be thin as illustrated in FIG. 25A.

The method of restoring the size of the toner pack 100 to take air in the toner pack 100 is described to use the deformation of the pouch by the user. However, it is not limited thereto. The toner pack 100 may include a member having a restoration force such as a spring, or a loosening member, which expand the toner pack 100 by itself. Alternatively, a restoration force of the toner pack 100 itself may be used. These methods can exert the similar effect. In a case where the filter open/close seal 501 covering the filter 500 is not provided, the folded toner pack 100 itself may also seal the filter 500.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2023-207101, filed Dec. 7, 2023, which is hereby incorporated by reference herein in its entirety.

What is claimed is:

1. A toner container comprising:

a pouch configured to store toner, the pouch being formed of a film and having an opening portion; and a nozzle attached to the opening portion of the pouch and provided with a discharge port for discharging the toner stored in the pouch outside the toner container, wherein a filter member configured to allow air to pass through and prevent the toner from passing through is provided at a part of the pouch, and wherein the pouch is configured such that toner is discharged from the discharge port by reducing a volume of the pouch through application of an external force to the pouch from outside the pouch.

2. The toner container according to claim 1, wherein the filter member is provided at a position nearer to an end portion on an opposite side to the opening portion than to the opening portion in a first direction in which the pouch and the nozzle are aligned.

3. The toner container according to claim 1, wherein the pouch has a foldable gusset portion, and wherein the filter member is provided on the gusset portion.

4. The toner container according to claim 1, wherein the filter member has a sheet shape with a seal layer provided on one surface of the filter member, and wherein the filter member is configured in such a manner that the seal layer is heat welded on a surface of the pouch.

5. The toner container according to claim 1, further comprising a cap configured to be attachable to and detachable from the nozzle to cover around the nozzle, wherein the cap has a surface extending in a direction intersecting with a first direction in which the pouch and the nozzle are aligned in a state where the cap is attached to the nozzle, and wherein the toner container is configured to stand without support when the surface of the cap is brought into contact with a horizontal plane.

6. The toner container according to claim 1, further comprising a film-shaped seal member an end of which is fixed to the pouch, and movable between a first position to cover the filter member and a second position to expose the filter member.

7. An image forming apparatus comprising an attachment portion to which the nozzle of the toner container according to claim 1 is attachable, wherein, in a state where the nozzle is attached to the attachment portion, the filter member is located above the nozzle.

8. The toner container according to claim 1, wherein the pouch is deformable from a compressed state in which air is discharged from the pouch through the filter member to an expanded state in which air is taken into the pouch through the filter member.

9. The toner container according to claim 1, wherein the discharge port is provided in a side surface of the nozzle extending along a first direction in which the pouch and the nozzle are aligned.

* * * * *